(12) United States Patent
Nagai

(10) Patent No.: US 9,549,164 B2
(45) Date of Patent: Jan. 17, 2017

(54) IMAGE PROCESSING APPARATUS AND METHOD, AND RELATED COMPUTER PROGRAM

(71) Applicant: JVC KENWOOD Corporation, Kanagawa-ku, Yokohama-shi (JP)

(72) Inventor: Katsuyuki Nagai, Tokyo (JP)

(73) Assignee: JVC Kenwood Corporation, Kanagawa (JP)

( * ) Notice: Subject to any disclaimer, the term of this patent is extended or adjusted under 35 U.S.C. 154(b) by 479 days.

(21) Appl. No.: 14/034,890

(22) Filed: Sep. 24, 2013

(65) Prior Publication Data

US 2014/0092221 A1 Apr. 3, 2014

(30) Foreign Application Priority Data

Sep. 28, 2012 (JP) .................................. 2012-216318

(51) Int. Cl.
*H04N 13/00* (2006.01)
*H04N 13/02* (2006.01)

(52) U.S. Cl.
CPC ...... *H04N 13/0007* (2013.01); *H04N 13/0022* (2013.01); *H04N 13/026* (2013.01)

(58) Field of Classification Search
CPC .............. H04N 13/0022; H04N 13/026; H04N 13/0007
See application file for complete search history.

(56) References Cited

U.S. PATENT DOCUMENTS

| 2008/0150945 A1* | 6/2008 | Wang ...................... G06K 9/20 345/427 |
| 2008/0247670 A1* | 10/2008 | Tam ...................... G06T 7/0051 382/298 |
| 2010/0014781 A1* | 1/2010 | Liu ..................... H04N 13/0022 382/285 |
| 2010/0080448 A1* | 4/2010 | Tam ...................... G06T 7/0051 382/154 |
| 2011/0026808 A1* | 2/2011 | Kim ...................... G06T 7/0051 382/154 |
| 2011/0050864 A1* | 3/2011 | Bond .................... H04N 13/026 348/51 |
| 2011/0149103 A1* | 6/2011 | Hatakeyama .......... G06T 5/003 348/222.1 |
| 2011/0187820 A1* | 8/2011 | Gilboa ............... H04N 13/0029 348/43 |

(Continued)

FOREIGN PATENT DOCUMENTS

JP 2009-044722 2/2009

*Primary Examiner* — Neil Mikeska
(74) *Attorney, Agent, or Firm* — Louis Woo

(57) ABSTRACT

Externally-set mask patterns are corrected into corrected mask patterns in a variable correction degree. A depth map is processed for each of areas designated by the corrected mask patterns respectively. The depth map is for an input image. A different-viewpoint image is generated on the basis of the input image and the processed depth map. The different-viewpoint image relates to a viewpoint different from the viewpoint concerning the input image. A texture in the input image is analyzed to obtain an analyzation result. The correction of the externally-set mask patterns into the corrected mask patterns includes varying the correction degree in response to the obtained analyzation result.

10 Claims, 16 Drawing Sheets

(56) References Cited

U.S. PATENT DOCUMENTS

| | | | |
|---|---|---|---|
| 2012/0120192 A1* | 5/2012 | Alregib | G06T 5/00 348/43 |
| 2012/0148173 A1* | 6/2012 | Shin | H04N 13/0011 382/300 |
| 2012/0194506 A1* | 8/2012 | Passmore | G06T 15/00 345/419 |
| 2012/0242790 A1* | 9/2012 | Sandrew | H04N 13/0267 348/43 |
| 2012/0257814 A1* | 10/2012 | Kohli | G06T 5/005 382/154 |

* cited by examiner

IMAGE PROCESSING APPARATUS AND METHOD, AND RELATED COMPUTER PROGRAM

CROSS-REFERENCE TO RELATED APPLICATIONS

This application claims priority from Japanese patent application number 2012-216318, filed on Sep. 28, 2012, the disclosure of which is hereby incorporated by reference.

BACKGROUND OF THE INVENTION

Field of the Invention

This invention relates to a method and an apparatus for converting a 2D (two dimensional) image signal into a 3D (three-dimensional) image signal. In addition, this invention relates to a computer program for converting a 2D image signal into a 3D image signal.

Description of the Related Art

In recent years, movies and broadcasts with 3D video contents have been spread. To allow a viewer to have stereoscopic vision (3D vision), it is necessary to provide a pair of an image for viewer's right eye and an image for viewer's left eye between which a parallax or a disparity is present. Such a pair is referred to as a 3D pair, a 3D image pair, or a stereoscopic image pair also.

In a typical 3D display system with 3D glasses, images for viewer's right eye and images for viewer's left eye are alternately indicated on a time sharing basis, and a viewer wears shutter glasses designed to allow viewer's right eye to observe the indicated right-eye images only and allow viewer's left eye to observe the indicated left-eye images only. The shutter glasses are 3D glasses for enabling the viewer to have stereoscopic vision.

In another typical 3D display system with 3D glasses, images for viewer's right eye are indicated with a first polarization state and images for viewer's left eye are indicated with a second polarization state different from the first polarization state, and a viewer wears polarized glasses designed to allow viewer's right eye to observe the indicated right-eye images only and allow viewer's left eye to observe the indicated left-eye images only. The polarized glasses are 3D glasses for enabling the viewer to have stereoscopic vision.

A conventional glassless 3D display system is designed so that images for viewer's right eye and images for viewer's left eye are indicated on a spatially separation basis, and a viewer does not need to wear 3D glasses. In the glassless system, the resolution of 3D images perceived by the viewer is relatively low.

The typical systems with the 3D glasses and the glassless system are similar in that images for viewer's right eye and images for viewer's left eye are necessary.

Regarding generation of 3D video, there are first and second conventional methods of making 3D image pairs, that is, pairs each having an image for viewer's right eye and an image for viewer's left eye. The first conventional method uses two spatially-separated cameras which simultaneously take a right-eye image and a left-eye image respectively at every shooting moment. The second conventional method uses one camera only. In the second conventional method, every image taken by the camera is edited into an image having a parallax or a disparity relative to the original image. The editing-result image is assigned to one of viewer's right and left eyes while the original image is assigned to the other. Accordingly, the original image and the editing-result image make a 3D pair. Generally, the second conventional method includes a technique of converting a 2D image signal (an output signal from a camera) into a 3D image signal that represents a stream of 3D pairs each having a right-eye image and a left-eye image.

As disclosed in, for example, Japanese patent application publication number 2009-044722, it is known to shift an original 2D image in units of a pixel or pixels through the use of a depth map to generate another 2D image seen from a viewpoint different from that concerning the original 2D image. The shift-result 2D image is assigned to one of viewer's right and left eyes while the original 2D image is assigned to the other. Accordingly, the original 2D image and the shift-result 2D image make a 3D pair. The pixel shift causes lost or missing pixels in the shift-result 2D image. Generally, each of the missing pixels is interpolated from nearby pixels.

An amount of pixel shift is designed to increase as a related step-like depth change is greater. Thus, in the case where a step-like change in depth is great at a boundary between objects in the original image, the number of missing pixels, that is, the missing area in the shift-result image is great at the boundary. As previously mentioned, the missing pixels are interpolated from nearby pixels. When the missing area is large, more places tend to occur where interpolated pixels do not match the positions of corresponding missing pixels. These places deteriorate the shift-result image.

SUMMARY OF THE INVENTION

It is a first object of this invention to provide an apparatus for converting a 2D image signal into a 3D image signal which can improve the image quality of a portion of a shift-result image at each boundary between objects.

It is a second object of this invention to provide a method of converting a 2D image signal into a 3D image signal which can improve the image quality of a portion of a shift-result image at each boundary between objects.

It is a third object of this invention to provide a computer program for converting a 2D image signal into a 3D image signal which can improve the image quality of a portion of a shift-result image at each boundary between objects.

A first aspect of this invention provides an image processing apparatus comprising a mask correcting section configured to correct externally-set mask patterns into corrected mask patterns in a variable correction degree; a depth map processing section configured to process a depth map for each of areas designated by the corrected mask patterns respectively, the depth map being for an input image; an image generating section configured to generate a different-viewpoint image on the basis of the input image and the depth map processed by the depth map processing section, the different-viewpoint image relating to a viewpoint different from the viewpoint concerning the input image; and a texture analyzing section configured to analyze a texture in the input image to obtain an analyzation result; wherein the mask correcting section varies the correction degree in response to the analyzation result obtained by the texture analyzing section.

A second aspect of this invention is based on the first aspect thereof, and provides an image processing apparatus wherein the mask correcting section comprises filters each having a settable number of taps and configured to filter the externally-set mask patterns to obtain the corrected mask patterns; and means for setting the number of taps in each of the filters in response to the analyzation result.

A third aspect of this invention is based on the second aspect thereof, and provides an image processing apparatus wherein the mask correcting section subjects a value of the analyzation result to a prescribed computation process to calculate a desired tap number, and sets the number of taps in each of the filters to the calculated desired tap number.

A fourth aspect of this invention is based on the second aspect thereof, and provides an image processing apparatus wherein the mask correcting section compares a value of the analyzation result with a prescribed threshold value, and fixes the number of taps in each of the filters to a prescribed number when the value of the analyzation result is less than the prescribed threshold value.

A fifth aspect of this invention is based on the second aspect thereof, and provides an image processing apparatus wherein the mask correcting section normalizes a value of the analyzation result into a normalization range to obtain a normalized value and replaces the value of the analyzation result with the obtained normalized value, and sets the obtained normalized value to a prescribed minimum value when the value of the analyzation result is smaller than the normalization range and sets the obtained normalized value to a prescribed maximum value when the value of the analyzation result is greater than the normalization range.

A sixth aspect of this invention is based on the second aspect thereof, and provides an image processing apparatus wherein the mask correcting section comprises a prescribed conversion table for conversion of a value of the analyzation result into a desired tap number; means for accessing the prescribed conversion table in response to the value of the analyzation result to read out a corresponding desired tap number therefrom; and means for setting the number of taps in each of the filters to the read-out desired tap number.

A seventh aspect of this invention is based on the first aspect thereof, and provides an image processing apparatus wherein the mask correcting section filters a value of the analyzation result into a filtered value and replaces the value of the analyzation result by the filtered value.

An eighth aspect of this invention is based on the first aspect thereof, and provides an image processing apparatus wherein the texture analyzing section differentiates at least one of luminance, hue, brightness, and chroma in the input image to obtain a differentiation result, and labels the obtained differentiation result as the analyzation result.

A ninth aspect of this invention provides a method of processing an image which comprises the steps of correcting externally-set mask patterns into corrected mask patterns in a variable correction degree; processing a depth map for each of areas designated by the corrected mask patterns respectively, the depth map being for an input image; generating a different-viewpoint image on the basis of the input image and the processed depth map, the different-viewpoint image relating to a viewpoint different from the viewpoint concerning the input image; and analyzing a texture in the input image to obtain an analyzation result; wherein said correcting includes varying the correction degree in response to the obtained analyzation result.

A tenth aspect of this invention provides an image processing program for enabling a computer to implement processes comprising the processes of correcting externally-set mask patterns into corrected mask patterns in a variable correction degree; processing a depth map for each of areas designated by the corrected mask patterns respectively, the depth map being for an input image; generating a different-viewpoint image on the basis of the input image and the processed depth map, the different-viewpoint image relating to a viewpoint different from the viewpoint concerning the input image; and analyzing a texture in the input image to obtain an analyzation result; wherein said correcting includes varying the correction degree in response to the obtained analyzation result.

This invention has the following advantage. Regarding a technique of converting a 2D image signal into a 3D image signal, it is possible to improve the image quality of a portion of a shift-result image at each boundary between objects.

DETAILED DESCRIPTION OF THE INVENTION

Prior-art conversion of a 2D image signal into a 3D image signal will be explained below for a better understanding of this invention.

Figure 1:
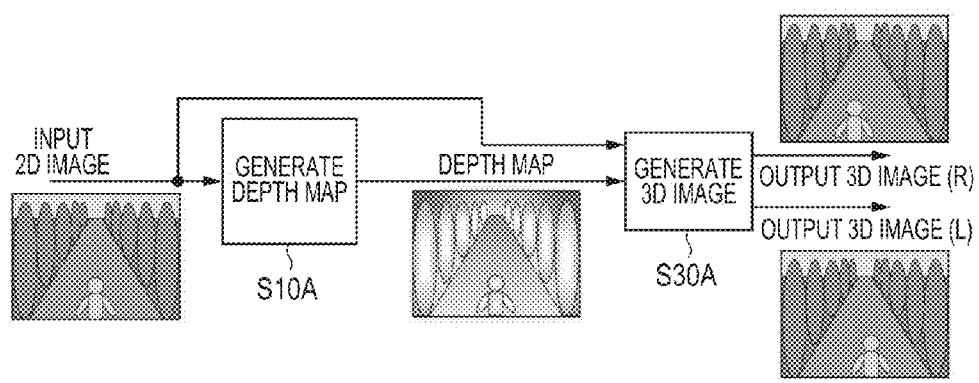
FIG. 1 is a diagram of a prior-art process of converting a 2D image signal into a 3D image signal.

FIG. 1 shows a prior-art process of converting a 2D image signal into a 3D image signal. In the prior-art process of FIG. 1, at a step S10A, data indicative of a depth map (depth information) is generated from an input signal representing a 2D image.

At a step S30A, an output 3D image signal representing a 3D pair of right-eye and left-eye images is generated from the input 2D image signal and the depth map data. The output 3D image signal is composed of a right-eye image signal representing the right-eye image and a left-eye image signal representing the left-eye image.

Specifically, the input 2D image signal is subjected to pixel shift according to the depth map data to generate a shift-result 2D image signal. The input 2D image signal is used as the right-eye image signal in the output 3D image signal while the shift-result 2D image signal is used as the left-eye image signal therein.

First Embodiment

Figure 2:
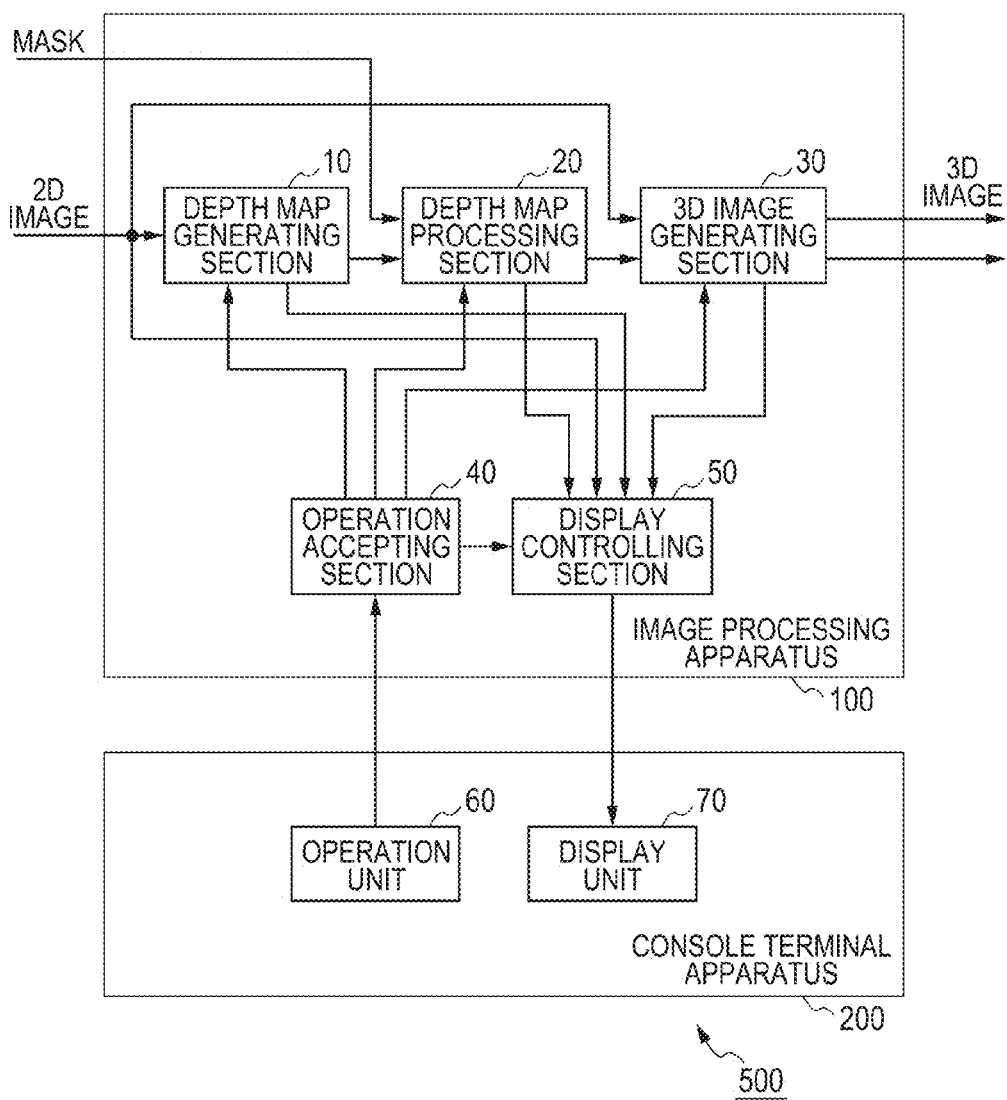
FIG. 2 is a diagram of an image editing system according to a first embodiment of this invention.

FIG. 2 shows an image editing system 500 according to a first embodiment of this invention. The image editing system 500 includes an image processing apparatus 100 and a console terminal apparatus 200.

The console terminal apparatus 200 is used by an image maker (referred to as a user hereafter) in order to make and edit images. The console terminal apparatus 200 includes an operation unit 60 and a display unit 70. The operation unit 60 has an input device such as a keyboard or a mouse. The display unit 70 has an output device such as a display. The console terminal apparatus 200 may include an input/output device such as a touch panel display forming the operation unit 60 and the display unit 70. The console terminal apparatus 200 may include a user interface such as a printer or a scanner using printed matters as media. When actuated by the user, the operation unit 60 generates a signal in accordance with the actuation and outputs the generated signal to the image processing apparatus 100. The display unit 70 indicates an image represented by a signal generated by and outputted from the image processing apparatus 100.

The image processing apparatus 100 includes a processor, memories, LSI devices, and an interface combined to form a computer that operates in accordance with a control program (a computer program) loaded into at least one of the memories or an external memory or storage. The computer and the control program are designed to implement the following sections of the image processing apparatus 100.

In the image processing apparatus 100, there are provided function blocks assigned to respective sections including a depth map generating section 10, a depth map processing section 20, a 3D (three dimensional) image generating section 30, an operation accepting section 40, and a display controlling section 50.

All the functions of the depth map generating section 10, the depth map processing section 20, and the 3D image generating section 30 may be implemented by the control program.

The image processing apparatus 100 may include logic circuits dedicated to the functions of the depth map generating section 10 and the 3D image generating section 30. In this case, the function of the depth map processing section 20 may be implemented by the control program.

The depth map generating section 10 receives an input image signal representing a 2D (two dimensional) image referred to as an input 2D image or an original-viewpoint 2D image. Preferably, the input 2D image is repetitively updated. The section 10 generates a basic depth map on the basis of the input 2D image and a depth model. The generated basic depth map is for the input 2D image. The basic depth map is a gray scale image where depth values assigned to respective pixels are expressed by luminance values.

The depth map generating section 10 estimates the scene structure of the input 2D image and generates a basic depth map through the use of a depth model suited to the estimated scene structure. The depth map generating section 10 combines basic depth models at a variable composition ratio to form a final depth model to be used for the generation of a basic depth map. The composition ratio is varied in accordance with the estimated scene structure of the input 2D image.

Figure 3:
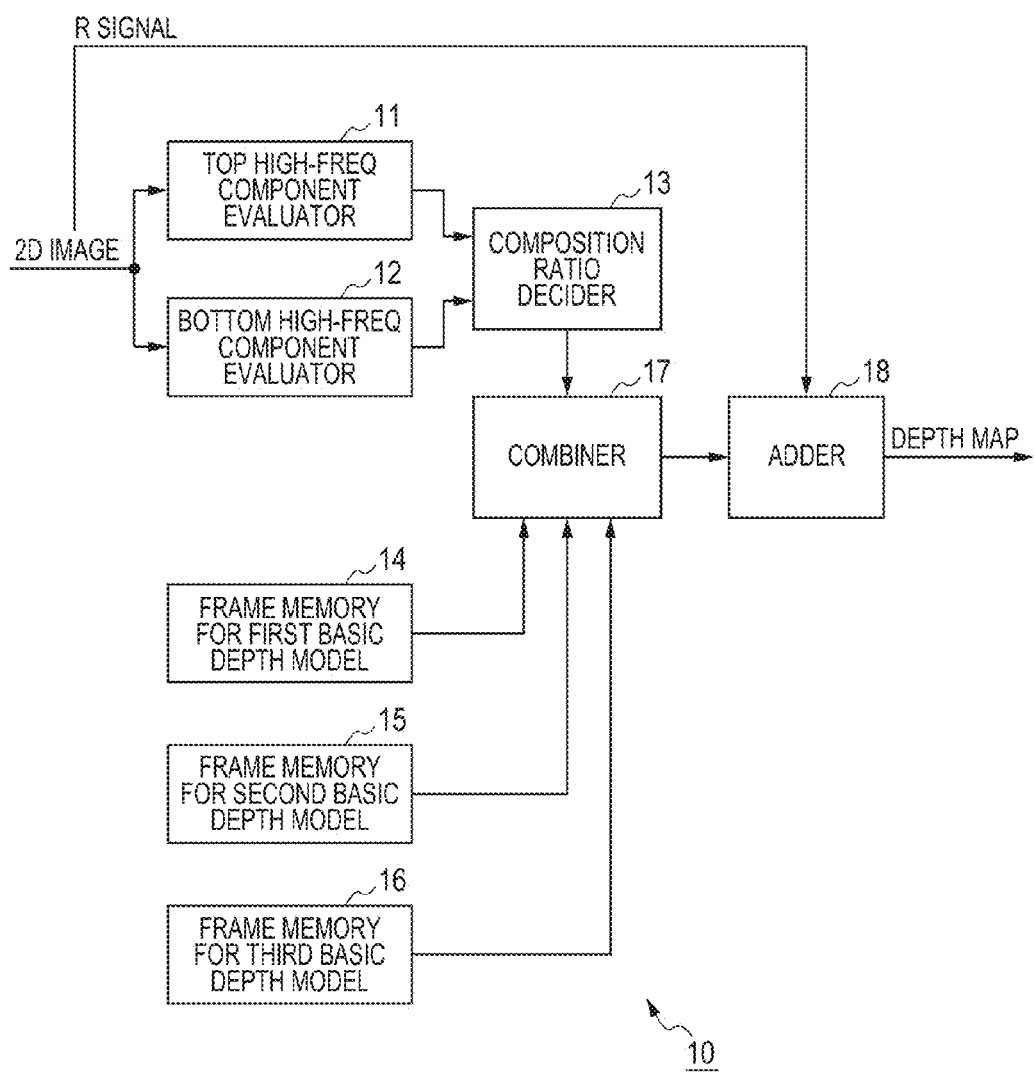
FIG. 3 is a diagram of a depth map generating section in FIG. 2.

As shown in FIG. 3, the depth map generating section 10 includes a top high-frequency component evaluator 11, a bottom high-frequency component evaluator 12, a composition ratio decider 13, frame memories 14, 15, and 16, a combiner 17, and an adder 18.

For a prescribed top part of the 2D image to be processed (the input 2D image), the top high-frequency component evaluator 11 calculates the ratio of the number of pixels represented by high-spatial-frequency components of the input image signal to the number of all pixels. The top high-frequency component evaluator 11 labels the calculated ratio as an evaluation value of high-spatial-frequency components of the input image signal for the prescribed top part of the input 2D image. Preferably, the prescribed top part of the input 2D image is substantially a top 20% part thereof.

For a prescribed bottom part of the 2D image to be processed (the input 2D image), the bottom high-frequency component evaluator 12 calculates the ratio of the number of pixels represented by high-spatial-frequency components of the input image signal to the number of all pixels. The bottom high-frequency component evaluator 12 labels the calculated ratio as an evaluation value of high-spatialfrequency components of the input image signal for the prescribed bottom part of the input 2D image. Preferably, the prescribed bottom part of the input 2D image is substantially a bottom 20% part thereof.

The frame memory 14 stores a signal representative of a first basic depth model. The frame memory 15 stores a signal representative of a second basic depth model. The frame memory 16 stores a signal representative of a third basic depth model. The first basic depth model is a 1-frame picture having upper and lower parts each conforming to a concave spherical surface. The second basic depth model is a 1-frame picture having an upper part conforming to a cylindrical surface with a vertical axis and a lower part conforming to a concave spherical surface. The third basic depth model is a 1-frame picture having an upper part conforming to a flat surface and a lower part conforming to a cylindrical surface with a horizontal axis.

The composition ratio decider 13 is informed of the evaluation values calculated by the top high-frequency component evaluator 11 and the bottom high-frequency component evaluator 12. As previously mentioned, the evaluation value calculated by the top high-frequency component evaluator 11 (the top-part evaluation value) is of high-spatial-frequency components of the input image signal for the prescribed top part of the input 2D image. The evaluation value calculated by the bottom high-frequency component evaluator 12 (the bottom-part evaluation value) is of high-spatial-frequency components of the input image signal for the prescribed bottom part of the input 2D image. The composition ratio decider 13 determines a composition ratio, at which the signals of the first, second, and third basic depth models should be combined, on the basis of the evaluation values. The determined composition ratio is expressed by a set of coefficients k1, k2, and k3 assigned to the first, second, and third basic depth models respectively, where k1+k2+k3=1.

The combiner 17 is informed of the composition ratio (the coefficients k1, k2, and k3) determined by the composition ratio decider 13. The combiner 17 receives the signals of the first, second, and third basic depth models from the frame memories 14, 15, and 16. The combiner 17 multiplies the signal of the first basic depth model by the coefficient k1 to generate a first multiplication-result signal. The combiner 17 multiplies the signal of the second basic depth model by the coefficient k2 to generate a second multiplication-result signal. The combiner 17 multiplies the signal of the third basic depth model by the coefficient k3 to generate a third multiplication-result signal. The combiner 17 adds the first, second, and third multiplication-result signals into a signal representative of a synthesized fundamental depth model. The combiner 17 feeds the signal of the synthesized fundamental depth model to the adder 18.

The composition ratio decider 13 is designed to implement the following actions. When the top-part evaluation value is low, the ratio of the second basic depth model is increased to make the depth in the top part greater with the recognition that there is a sky or a flat wall in the top part. When the bottom-part evaluation value is low, the ratio of the third basic depth model is increased to make the top part flat as a distant view and to make the depth smaller as the position of interest gets near the lower edge of the bottom part with the recognition that there is a flat ground or a continuously-extending surface of the water in the bottom part.

The adder 18 receives an R signal (a red signal) extracted from the input image signal. The adder 18 superimposes the received R signal on the signal of the synthesized fundamental depth model to generate a signal representing a basic depth map. The adder 18 outputs the signal of the basic depth map.

One of the reasons for using the R signal is that in an environment almost equivalent to the front-light environment and under a condition where the texture brightness does not change largely, the rules of thumb show that the intensity of the R signal matches the concavity and convexity of the object in many cases. Another reason is that the red color and a warm color, called advancing colors in chromatics, are characterized in that they make the depth to be recognized closer to the front than a cold color. The attribute that makes the depth to be recognized closer to the front can enhance the cubic effect (the 3D effect).

With reference back to FIG. 2, the depth map processing section 20 receives the signal of the basic depth map from the adder 18 (see FIG. 3) in the depth map generating section 10. The section 20 processes the received signal of the basic depth map into a signal representing a final depth map. Plural object areas in the basic depth map are designated by plural externally-set mask patterns (shortened to masks hereafter). The section 20 individually or independently processes each of the object areas in the basic depth map. Specifically, the section 20 subjects each of the object areas to processing of at least one of different types such as gain adjustment, offset adjustment, and gradation processing. Detailed operation of the depth map processing section 20 will be indicated later.

The 3D image generating section 30 receives the input image signal, and receives the signal of the final depth map from the depth map processing section 20. The 3D image generating section 30 generates, from the input image signal and the signal of the final depth map, a signal representing a 2D image (a different-viewpoint 2D image) seen from a viewpoint different from that concerning the original-viewpoint 2D image represented by the input image signal. The original-viewpoint 2D image and the different-viewpoint 2D image make a 3D pair (a 3D image pair). One of the original-viewpoint 2D image and the different-viewpoint 2D image is assigned to viewer's right eye, and the other is assigned to viewer's left eye. The 3D image generating section 30 outputs one of the input image signal and the signal of the different-viewpoint 2D image as an image signal for viewer's right eye (a right-eye image signal), and outputs the other as an image signal for viewer's left eye (a left-eye image signal).

The generation of the different-viewpoint 2D image from the original-viewpoint 2D image and the final depth map will explained below in more detail. In the case of generating an image seen from a viewpoint shifted leftward from that concerning the original-viewpoint 2D image, a part of the texture of the original-viewpoint 2D image, which is to be displayed in front of the screen for the viewer, is shifted to the right by a given amount. On the other hand, a part of the texture of the original-viewpoint 2D image, which is to be displayed behind the screen for the viewer, is shifted to the left by a given amount.

The final depth map has an array of pixels assigned luminance values Yd respectively. The letter "m" denotes a convergence value regarding the pop-up effect. The letter "n" denotes a depth value regarding the cubit effect. In ascending order of the luminance values Yd, the 3D image generating section 30 shifts the texture of the original-viewpoint 2D image to the right by (Yd−m)/n pixels on a pixel-by-pixel basis provided that the value of (Yd−m)/n is positive. When the value of (Yd−m)/n is negative, the 3D image generating section 30 shifts the texture of the original-viewpoint 2D image to the left by (m−Yd)/n pixels on a pixel-by-pixel basis. The viewer perceives a texture, corresponding to small luminance values Yd in the final depth map, as displayed rearward of the screen. On the other hand, the viewer perceives a texture, corresponding to great luminance values Yd in the final depth map, as displayed in front of the screen. Preferably, the luminance values Yd, the convergence value "m", and the depth value "n" are in the range of 0 to 255. The convergence value "m" is preset to, for example, 200. The depth value "n" is preset to, for example, 20.

The depth map generation by the depth map generating section 10 and the 3D image pair generation by the 3D image generating section 30 may be those disclosed in Japanese patent application publication numbers 2005-151534 and 2009-044722, the disclosure of which is hereby incorporated by reference.

The operation accepting section 40 accepts every command or information signal inputted via the operation unit 60 in the console terminal apparatus 200. The operation accepting section 40 detects the contents of the input command or information signal. The operation accepting section 40 passes the input command or information signal to at least one of the depth map generating section 10, the depth map processing section 20, the 3D image generating section 30, and the display controlling section 50 according to the detected contents thereof.

The display controlling section 50 receives the input image signal, and receives the signal of the basic depth map and the signal of the final depth map from the depth map generating section 10 and the depth map processing section 20. Furthermore, the display controlling section 50 receives the right-eye and left-eye image signals from the 3D image generating section 30. In addition, the display controlling section 50 receives a command signal from the operation accepting section 40. The display controlling section 50 responds to the received command signal and thereby controls the display unit 70 in the console terminal apparatus 200 to indicate the 2D image represented by the input image signal, the basic depth map generated by the depth map generating section 10, the final depth map generated by the depth map processing section 20, or the 3D image pair generated by the 3D image generating section 30.

Figure 4:
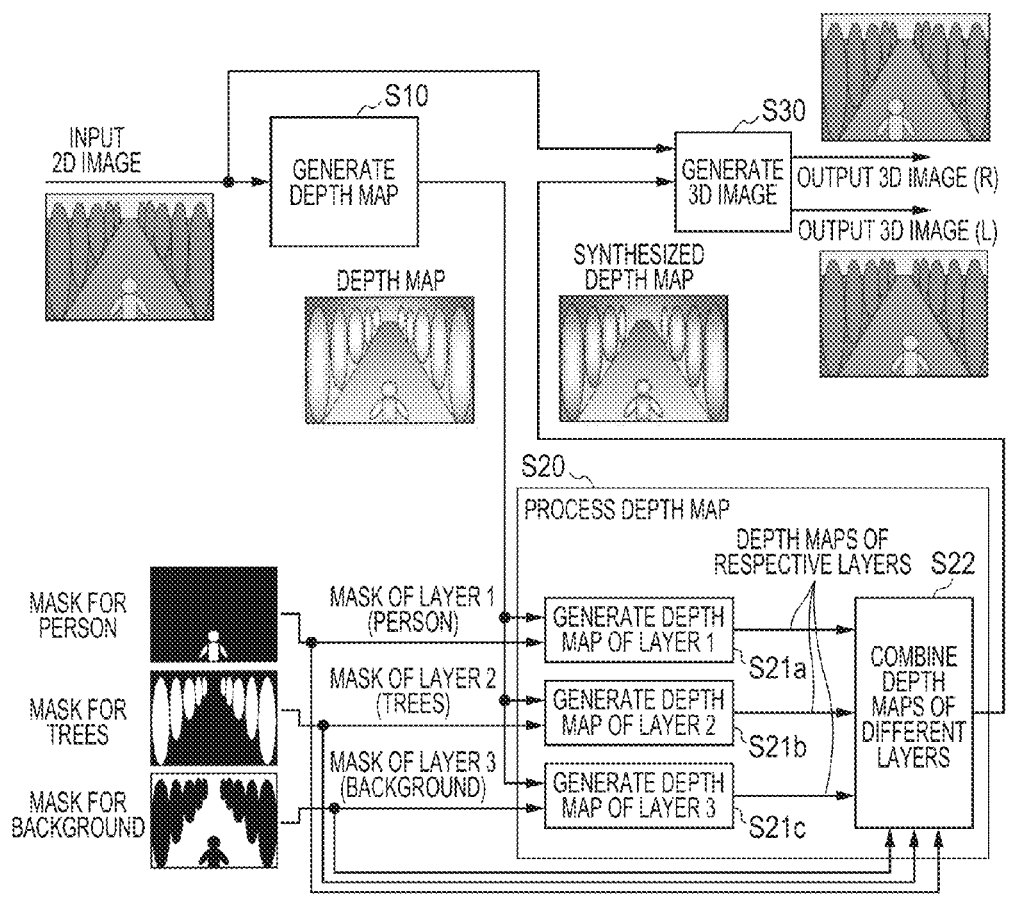
FIG. 4 is a diagram showing a flow of operation of the image editing system in FIG. 2.

With reference to FIG. 4, the input 2D image contains, for example, three objects. Specifically, the first object is a person. The second object is a set of two rows of trees. The third object is a background. At a step S10, the depth map generating section 10 generates the signal of the basic depth map from the input image signal. In the basic depth model, an area closer to white and having a higher luminance corresponds to an image portion nearer the viewer while an area closer to black and having a lower luminance corresponds to an image portion remoter from the viewer. Regarding the generation of a 3D image pair, an area in the basic depth map which is closer to while provides a greater pop-up amount (an advancing amount). On the other hand, an area in the basic depth map which is closer to black provides a greater receding amount.

Regarding the input 2D image, a depth condition is adjusted on an object-by-object basis. To this end, the depth map processing section 20 carries out an effect adjustment independently for each of areas in the basic depth map which correspond to the areas of the objects in the input 2D image. Specifically, masks are prepared which indicate the areas of the objects in the input 2D image respectively. Object areas are provided in the basic depth map through the use of the prepared masks. An effect adjustment is independently carried out for each of the object areas. As a result, fundamental depth maps (layer depth maps) related with the respective object areas are generated from the basic depth map. The fundamental depth maps are combined into the final depth map to be used for the generation of the different-viewpoint 2D image from the original-viewpoint 2D image.

At the step S10 in FIG. 4, the depth map generating section 10 automatically generates the basic depth map for the input 2D image. The depth map processing section 20 receives the signal of the basic depth map from the depth map generating section 10. Furthermore, the depth map processing section 20 receives information representative of masks.

The mask information may be generated in the following first method. The image editing system 500 can change into a mask generating mode of operation when the user actuates the operation unit 60 accordingly. During the mask generating mode of operation, the display controlling section 50 controls the display unit 70 to indicate the input 2D image in response to a command signal from the operation accepting section 40. The user traces the contours of objects in the indicated 2D image while actuating the operation unit 60. The operation accepting section 40 receives, from the operation unit 60, an information signal representing the traced contours of the objects. The operation accepting section 40 obtains information representative of masks from the received information signal. The masks correspond to the areas of the objects (the object areas) respectively. The operation accepting section 40 outputs the mask information to the depth map processing section 20.

The mask information may be generated in the following second method. The user may draw the contours of objects on a printed matter. In this case, the drawn contours are captured by a scanner in the user interface of the console terminal apparatus 200 to generate information representative of masks. The mask information is fed to the depth map processing section 20.

With reference to FIG. 4, there are prepared three masks for the person, the set of the tree rows, and the background in the input 2D image respectively. Each of the masks has an effective area or areas painted white and an ineffective area or areas painted black. In the mask for the person, an effective area is an image area occupied by the person while an ineffective area is the other image area. In the mask for the set of the tree rows, effective areas are image areas occupied by the trees while an ineffective area is the other image area. In the mask for the background, an effective area is an image area occupied by the background while ineffective areas are the other image areas.

The number of masks per input 2D image is not limited, and can be arbitrarily set by the user. Each object area can be decided and set by the user. One object area may be set for one person as shown in FIG. 4. Object areas may be set for respective body parts of a person. To generate a high-quality 3D image pair, it is preferable to set many object areas for one person to adjust a thickness and a depth direction for each of body parts of the person or for each of portions of every body part of the person.

The depth map processing section 20 receives the signal of the basic depth map from the depth map generating section 10. The basic depth map is referred to as the input depth map also. At a step S20 in FIG. 4, the section 20 processes the input depth map in response to the masks notified by, for example, the user interface in the console terminal apparatus 200. Specifically, the section 20 individually processes each of object areas in the input depth map which are defined by the respective masks. The processing of each object area is referred to as the layer processing. The processing of one object area generates one layer depth map (one fundamental depth map) from the input depth map. Thus, as a result of processing all the object areas, layer depth maps are generated from the input depth map for the respective object areas. One layer means a unit of processing with respect to an effective area in one mask.

With reference to FIG. 4, the masks for the person, the set of the tree rows, and the background are referred to as masks of layer 1, layer 2, and layer 3, respectively. At a step S21a, the depth map processing section 20 detects the area of the person (the object area) through the use of the mask of layer 1, and subjects the detected area in the input depth map to layer processing to generate a depth map of layer 1. At a step S21b, the depth map processing section 20 detects the areas of the tree rows (the object areas) through the use of the mask of layer 2, and subjects the detected areas in the input depth map to layer processing to generate a depth map of layer 2. At a step S21c, the depth map processing section 20 detects the area of the background (the object area) through the use of the mask of layer 3, and subjects the detected area in the input depth map to layer processing to generate a depth map of layer 3.

At a step S22, the depth map processing section 20 combines the depth maps of layer 1, layer 2, and layer 3 for the object areas into a synthesized depth map referred to as a final depth map. The depth map processing section 20 feeds a signal representative of the synthesized depth map (the final depth map) to the 3D image generating section 30.

At a step S30, the 3D image generating section 30 shifts pixels of the input 2D image in accordance with the synthesized depth map to generate a 2D image (a different-viewpoint 2D image) having a parallax or disparity relative to the input 2D image. The 3D image generating section 30 labels the input 2D image as an image for viewer's right eye (a right-eye image R), and labels the generated 2D image as an image for viewer's left eye (a left-eye image L). The 3D image generating section 30 outputs a pair of a signal representative of the right-eye image R and a signal representative of the left-eye image L as a 3D image signal.

The layer processing by the depth map processing section 20 may include gain adjustment designed to adjust a depth-wise thickness of a target object. An increase in gain makes the target object thicker. A decrease in gain makes the target object thinner.

Figure 5:
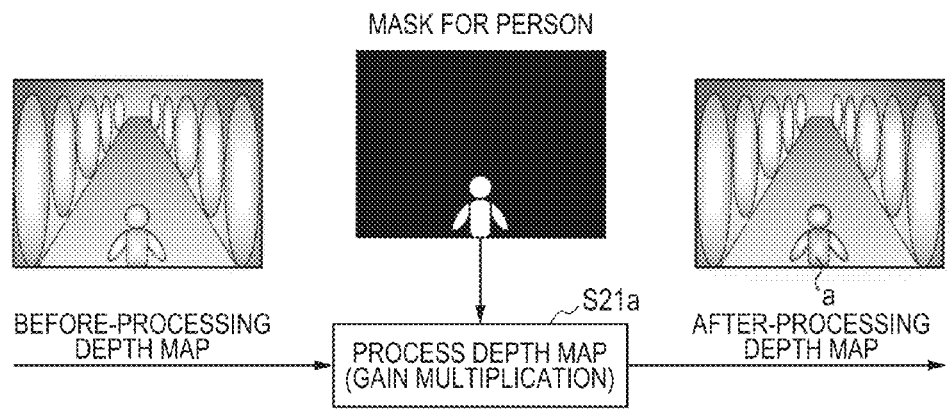
FIG. 5 is a diagram showing gain adjustment implemented by a depth map processing section in FIG. 2.

In the case where the layer processing is gain adjustment, the depth map processing section 20 operates as follows. With reference to FIG. 5, at the step S21a, the depth map processing section 20 detects an area in the input depth map which corresponds to the effective area in the mask for the person. The depth map processing section 20 multiplies only the depth values in the detected area by a gain to increase the amplitude of these depth values. Thereby, the depth map processing section 20 generates a depth map of layer 1 from the input depth map. In the depth map of layer 1, the area "a" occupied by the person has a great depth amplitude.

The layer processing by the depth map processing section 20 may include offset adjustment designed to adjust a depth-wise position of a target object. The addition of a positive offset value moves the target object in the pop-up direction. The addition of a negative offset value moves the target object in the receding direction.

Figure 6:
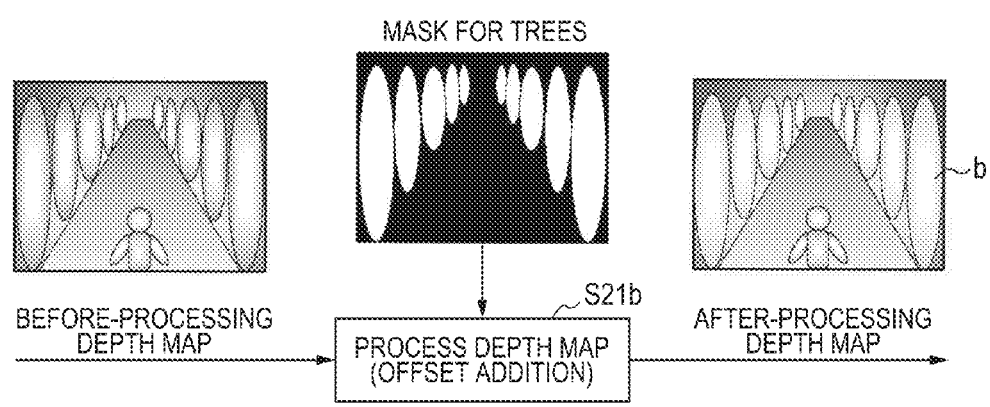
FIG. 6 is a diagram showing offset adjustment implemented by the depth map processing section in FIG. 2.

In the case where the layer processing is offset adjustment, the depth map processing section 20 operates as follows. With reference to FIG. 6, at the step S21b, the depth map processing section 20 detects areas in the input depth map which corresponds to the effective areas in the mask for the tree rows. The depth map processing section 20 adds, for example, a positive offset value to only the depth values in the detected areas to translationally jack up these depth values. Thereby, the depth map processing section 20 generates a depth map of layer 2 from the input depth map. In the depth map of layer 2, the areas "b" occupied by the trees have jacked-up depth values.

Figure 7:
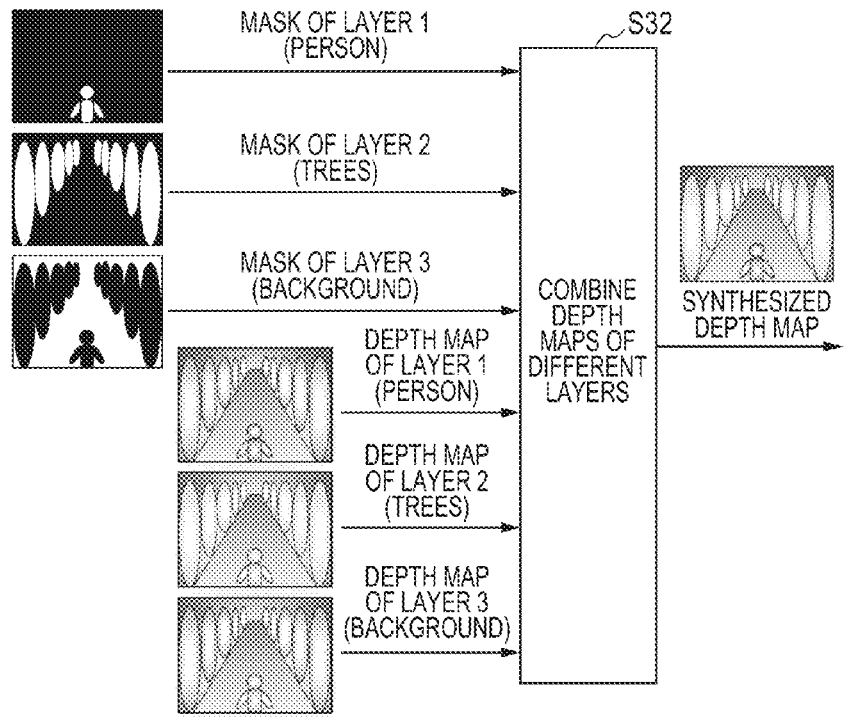
FIG. 7 is a diagram showing a process implemented by the depth map processing section in FIG. 2 for combining layer depth maps through the use of masks to generate a synthesized depth map.

With reference to FIG. 7, at the step S22, the depth map processing section 20 cuts out a portion from the depth map of layer 1 which corresponds to the effective area of the mask of layer 1 (the mask for the person). Furthermore, the depth map processing section 20 cuts out portions from the depth map of layer 2 which correspond to the effective areas of the mask of layer 2 (the mask for the tree rows). In addition, the depth map processing section 20 cuts out a portion from the depth map of layer 3 which corresponds to the effective area of the mask of layer 3 (the mask for the background). The depth map processing section 20 combines the cut-out portions of the depth maps of layer 1, layer 2, and layer 3 into a synthesized depth map, that is, a final depth map.

Figure 8:
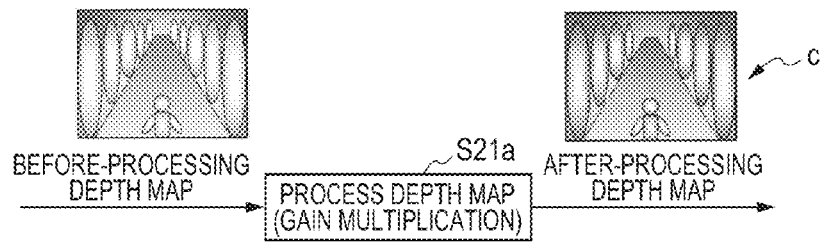
FIG. 8 is a diagram showing gain adjustment implemented by the depth map processing section in FIG. 2 without using a mask.

The depth map processing section 20 may implement gain adjustment without using a mask. With reference to FIG. 8, at the step S21a, the depth map processing section 20 multiplies all the depth values in the input depth map by a gain to increase the amplitude of all the depth values. Thereby, the depth map processing section 20 generates a depth map of layer 1 from the input depth map. The depth map of layer 1 has a great depth amplitude as denoted by the character "c". At the later step S22, the depth map processing section 20 uses only the depth values in a portion of the depth map of layer 1 which corresponds to the effective area of the mask of layer 1. The depth map processing section 20 ignores the depth values in a portion of the depth map of layer 1 which corresponds to the ineffective area of the mask of layer 1.

Figure 9:
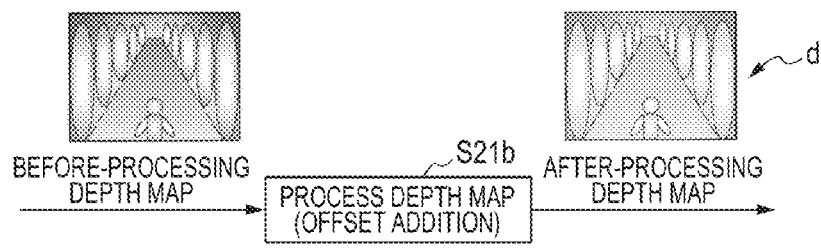
FIG. 9 is a diagram showing offset adjustment implemented by the depth map processing section in FIG. 2 without using a mask.

The depth map processing section 20 may implement offset adjustment without using a mask. With reference to FIG. 9, at the step S21b, the depth map processing section 20 adds, for example, a positive offset value to all the depth values in the input depth map to translationally jack up all the depth values. Thereby, the depth map processing section 20 generates a depth map of layer 2 from the input depth map. In the depth map of layer 2, all the depth values are jacked up as denoted by the character "d". At the later step S22, the depth map processing section 20 uses only the depth values in portions of the depth map of layer 2 which correspond to the effective areas of the mask of layer 2. The depth map processing section 20 ignores the depth values in a portion of the depth map of layer 2 which corresponds to the ineffective area of the mask of layer 2.

Figure 10:
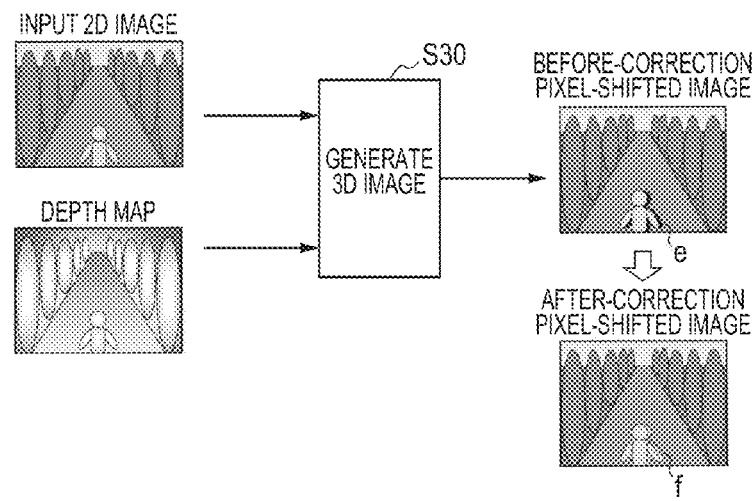
FIG. 10 is a diagram showing a first example of operation of a 3D image generating section in FIG. 2.

With reference to FIG. 10, the 3D image generating section 30 receives the signal of the synthesized depth map (the final depth map) from the depth map processing section 20. At the step S30, the 3D image generating section 30 shifts pixels of the input 2D image in accordance with the synthesized depth map to generate a 2D image (a different-viewpoint 2D image) having a parallax or disparity relative to the input 2D image. For example, the pixels constituting the person area (the area occupied by the person) in the input 2D image are shifted leftward. In the synthesized depth map of FIG. 10, the depth values in the map area corresponding to the person area result from the addition of an offset value and are hence jacked up. As the depth values in the map area corresponding to the person area are greater, the pop-up amount of the area of the person in a 3D image perceived by the viewer is greater.

In the case where the 3D image generating section 30 shifts the pixels in the person area without shifting the pixels in a background area around the person area, there occurs a missing pixel area, from which pixels are absent, in a different-viewpoint 2D image as denoted by the character "e" in FIG. 10. The 3D image generating section 30 corrects the missing pixel area into a corrected area "f" by interpolating pixels therein from pixels therearound, for example, pixels at the boundary or boundaries of the person area. Thus, the 3D image generating section 30 replaces the missing pixel area with the corrected area to complete the different-viewpoint 2D image.

Figure 11:
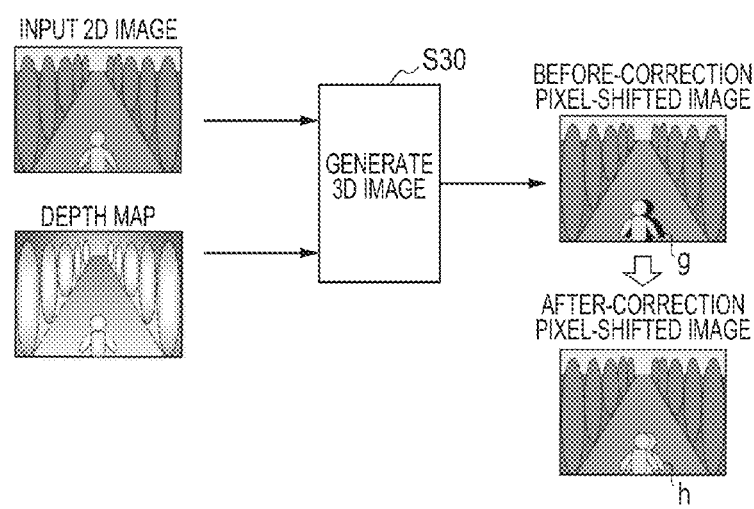
FIG. 11 is a diagram showing a second example of operation of the 3D image generating section in FIG. 2.

With reference to FIG. 11, in the case where a step-like depth change at a boundary of an object (a person) is greater, related pixels are more shifted so that a resultant pixel missing area is broader as denoted by the character "g". When pixels in a broader pixel missing area are interpolated from pixels therearound, a completed different-viewpoint 2D image at the boundary of the object tends to be more unnatural, inconsistent, and defective as denoted by the character "h".

The pixel shift amount for the person area in the input 2D image of FIG. 11 is greater than that of FIG. 10. The pixel missing area in FIG. 11 is broader than that in FIG. 10 as denoted by the characters "e" and "g". The pixels in the pixel missing area of FIG. 11 are interpolated from the pixels therearound to correct the pixel missing area into the corrected area. Similarly, the pixels in the pixel missing area of FIG. 10 are interpolated from the pixels therearound to correct the pixel missing area into the corrected area. The corrected area in each of FIGS. 10 and 11 tends to be inconsistent with the input 2D image. The corrected area should be a part of the background from the standpoint of consistency with the input 2D image. Thus, the shape of the person in the completed different-viewpoint 2D image tends to be more distorted in accordance with an increase in the corrected area as denoted by the character "h".

Generally, some objects in an input 2D image have unclear boundaries rather than clear ones. Unclear object boundaries are caused by, for example, defocusing, camera shake, or motion blur at a shooting moment. For an unclear object boundary, it is difficult to make a mask properly matching an actual object boundary. In the case where depth map processing, pixel shift, and pixel interpolation are performed through the use of a mask generated on the basis of an unclear object boundary, the related contour of an object in a 3D image perceived by the viewer tends to be unnatural.

Second Embodiment

A second embodiment of this invention is similar to the first embodiment thereof except for design changes mentioned hereafter. According to the second embodiment, pixels in a pixel missing area are interpolated in a manner such that in a corresponding corrected area, an object is smoothly or gradually replaced with a background. Thereby, unnaturalness at an object boundary can be inconspicuous.

Figure 12:
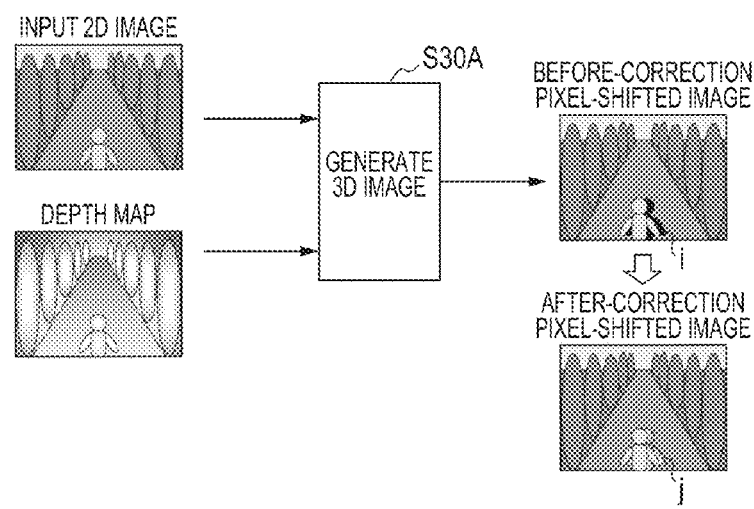
FIG. 12 is a diagram showing operation of a 3D image generating section in an image editing system according to a second embodiment of this invention.

With reference to FIG. 12, in the case where a step-like depth change at a boundary of an object (a person) is greater, related pixels are more shifted so that a resultant pixel missing area is broader as denoted by the character "i". The pixel missing area in FIG. 12 is broader than that in FIG. 10 as denoted by the characters "e" and "i". At a step S30A substituting for the step S30 in the first embodiment of this invention, a 3D image generating section 30 interpolates pixels in the pixel missing area so that in a corresponding corrected area, an object will be smoothly or gradually replaced with a background. Thus, unnaturalness in the boundary between the person and the background in a completed different-viewpoint 2D image is inconspicuous as denoted by the character "j".

Figure 13:
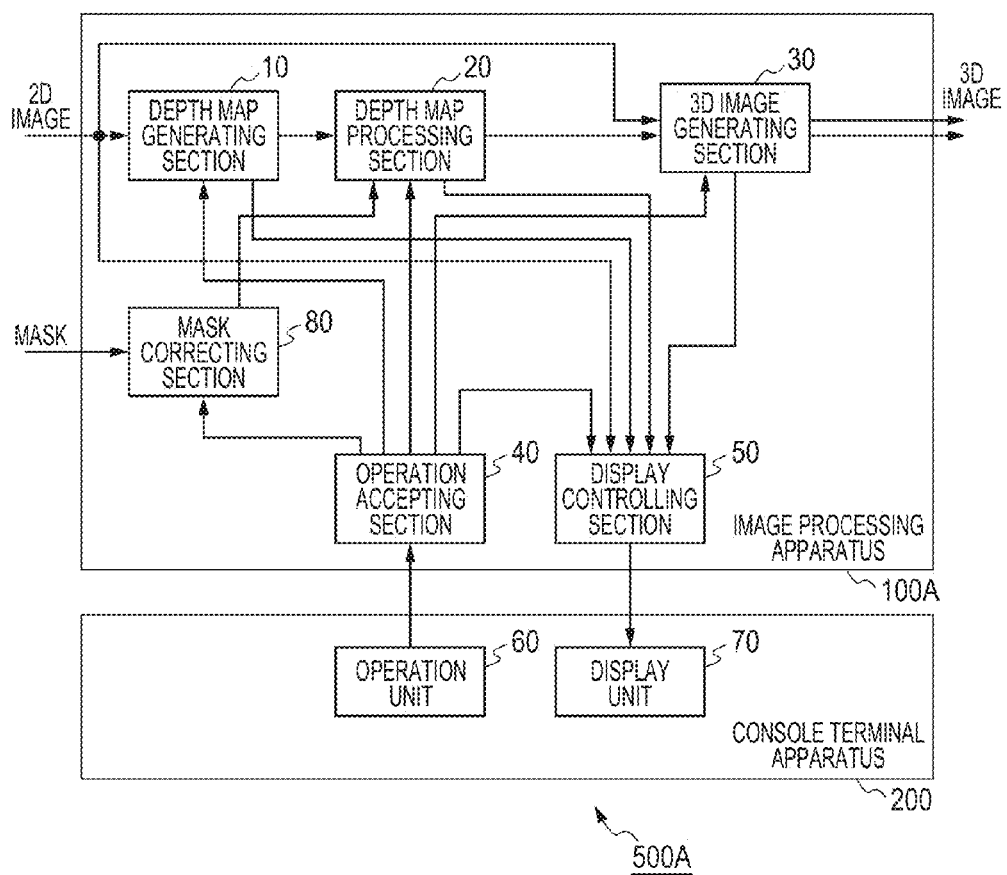
FIG. 13 is a diagram of the image editing system in the second embodiment of this invention.

FIG. 13 shows an image editing system 500A in the second embodiment of this invention. The image editing system 500A differs from the image editing system 500 of FIG. 2 in that an image processing apparatus 100A in the system 500A additionally has a mask correcting section 80. The image editing system 500A is similar to the image editing system 500 except for the following points.

The image processing apparatus 100A substitutes for the image processing apparatus 100 in FIG. 2. The mask correcting section 80 in the image processing apparatus 100A receives information representative of externally-set original masks. The mask correcting section 80 may receive, from an operation accepting section 40, information representative of original masks generated on the basis of an information signal outputted by a console terminal apparatus 200. The mask correcting section 80 corrects the original masks into corrected masks through an edge blurring process. Specifically, the mask correcting section 80 blurs object boundaries (edges) in the original masks to generate the corrected masks. The mask correcting section 80 outputs information representative of the corrected masks to a depth map processing section 20.

The depth map processing section 20 processes an input depth map into layer depth maps for object areas in accordance with the corrected masks respectively. The depth map processing section 20 alpha-blends the layer depth maps to generate a synthesized depth map (a final depth map). Specifically, the depth map processing section 20 combines the layer depth maps into the synthesized depth map in accordance with coefficients (α values) provided or defined in the corrected masks.

Figure 14:
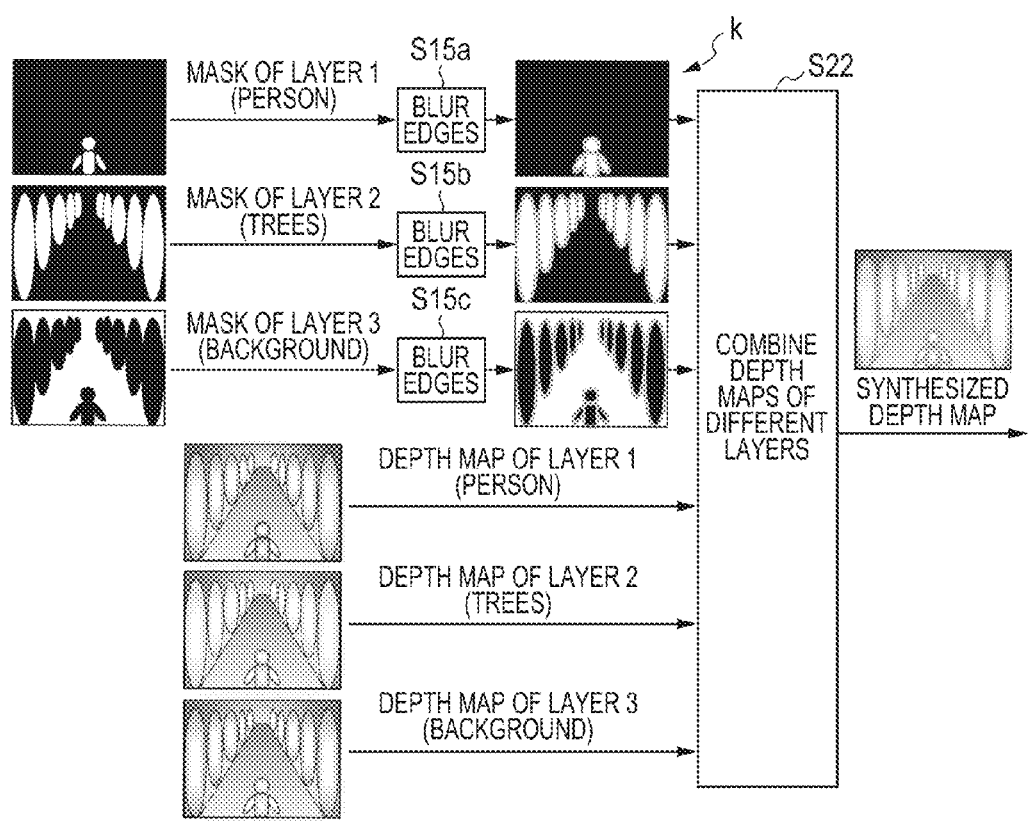
FIG. 14 is a diagram showing processes implemented by a mask correcting section and a depth map processing section in FIG. 13 for correcting original masks into corrected masks and combining layer depth maps through the use of the corrected masks to generate a synthesized depth map.

With reference to FIG. 14, there are original masks of layer 1, layer 2, and layer 3 for a person, a set of tree rows, and a background respectively. Each of the original masks has an effective area or areas painted white and an ineffective area or areas painted black, where the values of pixels in the effective area or areas are set to 1 (a blending percentage of 100%) and the values of pixels in the ineffective area or areas are set to 0 (a blending percentage of 0%).

The mask correction section 80 receives the information representative of the original masks of layer 1, layer 2, and layer 3 from, for example, the operation accepting section 40. At a step S15a, the mask correcting section 80 blurs object boundaries (edges) in the original mask of layer 1 to generate a corrected mask of layer 1 as denoted by the character "k". Specifically, the mask correcting section 80 detects a boundary between an area having pixel values of 0 and an area having pixel values of 1 in the original mask of layer 1. The mask correcting section 80 labels the detected boundary as an edge, and combines the edge and a nearby area (an area adjacent to the edge) into an edge area. Preferably, the nearby area extends along one side of the edge or around the edge. The edge may be centered with respect to the nearby area. The mask correcting section 80 changes the values of pixels in the edge area to values between 0 and 1 exclusive (that is, values greater than 0 but smaller than 1 or blending percentages greater than 0% but smaller than 100%) in a manner such that the edge area will have a gradual or smooth pixel-value variation. Thereby, the mask correcting section 80 generates the corrected mask of layer 1. At a step S15b, the mask correcting section 80 blurs object boundaries (edges) in the original mask of layer 2 to generate a corrected mask of layer 2 in a way similar to the above-mentioned way. At a step S15c, the mask correcting section 80 blurs object boundaries (edges) in the original mask of layer 3 to generate a corrected mask of layer 3 in a way similar to the above-mentioned way.

At a step S22, the depth map processing section 20 combines depth maps of layer 1, layer 2, and layer 3 into a synthesized depth map, that is, a final depth map according to the changed and unchanged pixel values in the corrected masks of layer 1, layer 2, and layer 3. In the synthesized depth map, areas corresponding to the edge areas in the corrected masks of layer 1, layer 2, and layer 3 have smooth or gradual depth-value variations. The depth map processing section 20 informs a 3D image generating section 30 of the synthesized depth map.

The 3D image generating section 30 subjects an input 2D image to pixel shift and pixel interpolation through the use of the synthesized depth map to generate a different-viewpoint 2D image. In a 3D image perceived by the viewer, object boundaries smoothly or gradually vary so that unnaturalness thereat are inconspicuous.

Figure 15:
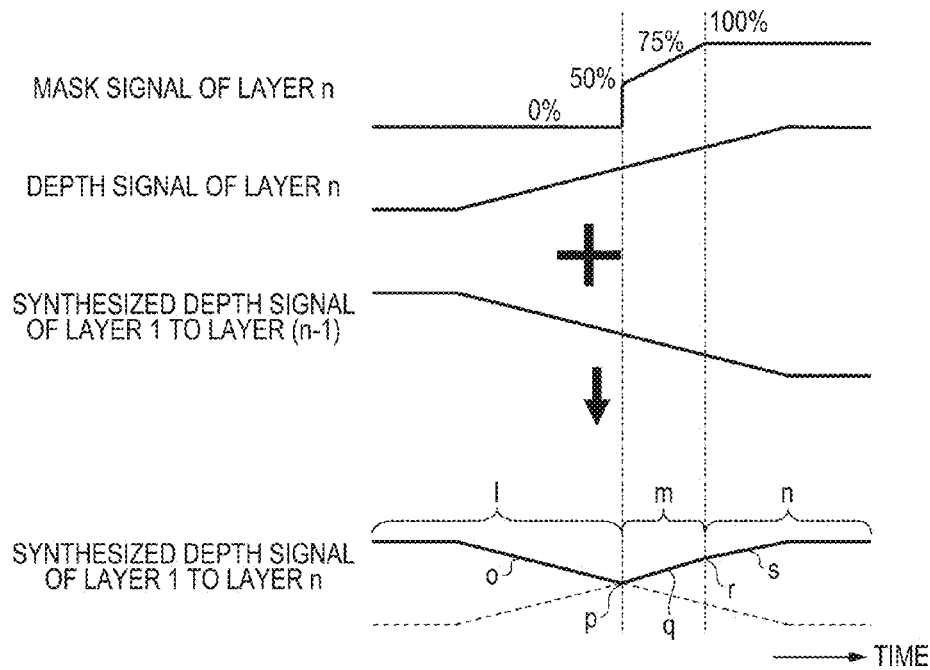
FIG. 15 is a time-domain diagram of a mask signal of a given layer, a depth signal of the given layer, and synthesized depth signals in the image editing system of FIG. 13.

With reference to FIG. 15, the depth map processing section 20 decides blending percentages or ratios for depth values in each layer depth map on the basis of pixel values in each corrected mask. To generate the synthesized depth map, the depth maps of the respective layers are superimposed in an order designated by the user and notified to the depth map processing section 20 via an operation unit 60 and the operation accepting section 40. For example, the depth map for the person, the depth map for the tree rows, and the depth map for the background are superimposed in that order to generate the synthesized depth map.

During the depth-map superimposition, two depth maps are blended on, for example, a line-by-line scanning basis. In FIG. 15, a mask signal representing one line of a corrected mask of layer "n" ("n" denotes a natural number) has an edge-area-corresponding portion composed of a vertical rise from 0% to 50% in pixel-value-based blending percentage and a following gentle slope varying from 50% to 100% in pixel-value-based blending percentage. A partial synthesized depth map $\Sigma(n-1)$ results from blending or combining depth maps of layers from layer 1 to layer (n-1). A depth map of layer "n" and the partial synthesized depth map $\Sigma(n-1)$ are blended into a partial synthesized depth map $\Sigma n$ according to the corrected mask for layer "n".

During a time interval "1" for which the blending percentage expressed by the mask signal of the corrected mask of layer "n" remains 0% (a 0:100 blending ratio), 0% of a depth signal representing one line of the depth map of layer "n" and 100% of a depth signal representing one line of the partial synthesized depth map $\Sigma(n-1)$ are blended into a depth signal representing one line of the partial synthesized depth map $\Sigma n$. Thus, the depth signal of the partial synthesized depth map $\Sigma(n-1)$ directly forms the depth signal of the partial synthesized depth map $\Sigma n$ without being overwritten or replaced by the depth signal of the depth map of layer "n" (see the character "o"). At a moment "p" when the blending percentage is 50% (a 50:50 blending ratio), 50% of the depth signal of the depth map of layer "n" and 50% of the depth signal of the partial synthesized depth map $\Sigma(n-1)$ are blended into the depth signal of the partial synthesized depth map $\Sigma n$.

During a time interval "m" for which the blending percentage varies from 50% to 100% (a 50:50 blending ratio to a 100:0 blending ratio), the depth signal of the depth map of layer "n" and the depth signal of the partial synthesized depth map $\Sigma(n-1)$ are blended into the depth signal of the partial synthesized depth map $\Sigma n$ at a blending ratio corresponding to that varying percentage. For example, at a moment "q" when the blending percentage is 75% (a 75:25 blending ratio), 75% of the depth signal of the depth map of layer "n" and 25% of the depth signal of the partial synthesized depth map $\Sigma(n-1)$ are blended into the depth signal of the partial synthesized depth map $\Sigma n$.

At a moment "r" when the blending percentage reaches 100% (a 100:0 blending ratio), 100% of the depth signal of the depth map of layer "n" and 0% of the depth signal of the partial synthesized depth map $\Sigma(n-1)$ are blended into the depth signal of the partial synthesized depth map $\Sigma n$. During a time interval "n" for which the blending percentage remains 100% (a 100:0 blending ratio), 100% of the depth signal of the depth map of layer "n" and 0% of the depth signal of the partial synthesized depth map $\Sigma(n-1)$ are blended into the depth signal of the partial synthesized depth map $\Sigma n$. Thus, the depth signal of the partial synthesized depth map $\Sigma(n-1)$ is fully overwritten or replaced by the depth signal of the depth map of layer "n", and the depth signal of the depth map of layer "n" directly forms the depth signal of the partial synthesized depth map $\Sigma n$ (see the character "s").

Blending the depth signal of the depth map of layer "n" and the depth signal of the partial synthesized depth map $\Sigma(n-1)$ uses the mask signal of the corrected mask of layer "n" rather than a mask signal of a corrected mask of layer "n-1". The blending ratio at which the depth signal of the depth map of layer "n" and the depth signal of the partial synthesized depth map $\Sigma(n-1)$ are blended is decided only by the mask signal of the corrected mask of layer "n". In an area where many depth maps of different layers overlap, depth values coming from a depth map of a low-position layer are diluted as depth-map superimposition progresses.

The mask correcting section 80 implements blurring every edge represented by mask signals of the original masks through a sequence of the following three basic steps. Firstly, every edge is shifted to a proper position with respect to a corresponding contour of a target object. As a result, object areas are expanded or contracted. Secondly, every shifted edge is sloped to be blurred. Finally, every sloped-edge area is spatially limited.

The mask correcting section 80 uses, for example, a low pass filter for blurring every edge. Each original mask has a black area or areas assigned pixel values of 0 and a white area or areas assigned pixel values of 1. The mask correcting section 80 subjects each original mask to low pass filtering to generate an intermediate mask in which pixel-value flat portions except edge areas are the same as those in the original mask, and the edge areas are sloped in pixel value and are hence blurred while the pixel values therein are between 0 and 1.

Preferably, at a stage before the low pass filtering, every edge represented by a mask signal of each original mask is shifted to expand or contract a related effective area. In some cases, it is desirable that a portion of an edge area in the original mask which extends outward of a related effective area in the original mask is sloped while another portion of the edge area which extends inward of the related effective area is maintained without being processed. In some other cases, it is desirable that the portion of the edge area which extends inward of the related effective area is sloped while another portion of the edge area which extends outward of the related effective area is maintained without being processed. In light of these cases, every edge is arbitrarily shifted.

Preferably, to prevent a sloped edge area from being increased in size by greater than an intended amount, the sloped edge area is spatially limited at a stage after the low pass filtering.

Figure 16:
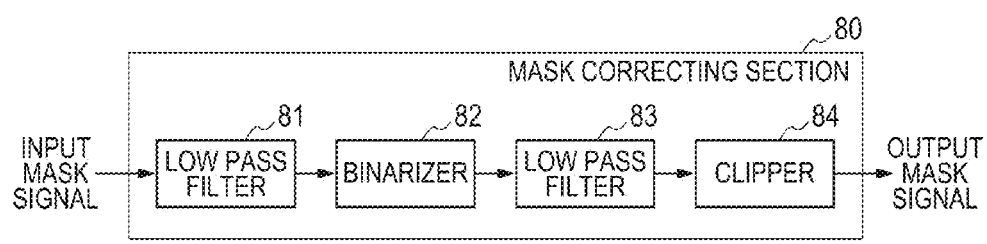
FIG. 16 is a diagram of the mask correcting section in FIG. 13.

FIG. 16 shows an example of the mask correcting section 80 which includes a first low pass filter 81, a binarizer (a binarizing device) 82, a second low pass filter 83, and a clipper 84 serially connected in that order. The mask correcting section 80 may be a computer that operates according a control program stored in an internal memory or an external memory or storage. In this case, the control program is designed to implement the first low pass filter 81, the binarizer 82, the second low pass filter 83, and the clipper 84. Alternatively, the first low pass filter 81, the binarizer 82, the second low pass filter 83, and the clipper 84 may be formed by separate hardware devices.

A mask signal of each original mask is past through the first low pass filter 81, and is hence subjected to low pass filtering. As a result, the original-mask signal is converted into a mask signal representing a first intermediate mask in which every edge is sloped. The binarizer 82 receives the first-intermediate-mask signal from the first low pass filter 81, and binarizes the received signal through the use of a first threshold value to generate a mask signal representing a second intermediate mask in which every pixel value is either 0 or 1. The operation of the first low pass filter 81 and the binarizer 82 shifts every edge represented by the original mask signal.

The second-intermediate-mask signal from the binarizer 82 is past through the second low pass filter 83, and is hence subjected to low pass filtering. As a result, the second-intermediate-mask signal is converted into a mask signal representing a third intermediate mask in which every edge is sloped. The clipper 84 receives the third-intermediate-mask signal from the second low pass filter 83, and clips the received signal through the use of a second threshold value to generate a mask signal representing a corrected mask. Specifically, the clipper 84 processes pixel values represented by the received signal so as to clip pixel values less than the second threshold value to 0 and leave other pixel values as they are. The corrected-mask signal generated by the clipper 84 is outputted from the mask correcting section 80.

Figure 17:
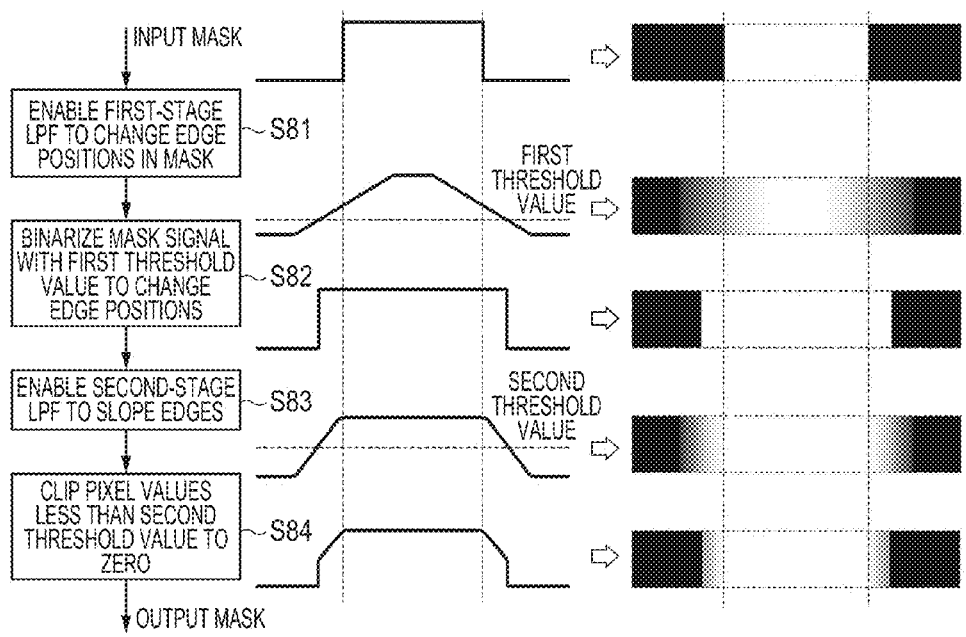
FIG. 17 is a diagram of operation of the mask correcting section in FIG. 16.

With reference to FIG. 17, every pixel in each original mask is expressed by a set of 8 bits, and every black pixel therein takes a state of, for example, 0 (0b00000000) while every white pixel therein takes a state of, for example, 255 (0b11111111). Thus, a mask signal representative of each original mask is generally a binary signal transitioning between a state of 0 and a state of 255.

The binary original-mask signal is inputted into the first low pass filter 81. At a step S81 in FIG. 17, the device 81 subjects the binary original-mask signal to low pass filtering as preprocessing with respect to shifting edges. Thereby, the first low pass filter 81 processes the binary original-mask signal into the mask signal representing the first intermediate mask in which every edge is sloped. In every sloped edge, pixels are in states between 0 and 255 exclusive.

At a step S82, the binarizer 82 receives the first-intermediate-mask signal from the first low pass filter 81, and binarizes the received signal through the use of the first threshold value as preprocessing with respect to shifting edges. Thereby, the binarizer converts the received signal into the binary mask signal of the second intermediate mask in which every pixel value is either 0 or 1 (every pixel is in either a state of 0 or a state of 255).

In the case where the first threshold value corresponds to a state of less than 127 which is the middle between 0 and 255, every edge represented by the binary second-intermediate-mask signal is shifted outward relative to a corresponding edge represented by the binary original-mask signal. In this case, the second intermediate mask has an expanded white area or areas. On the other hand, in the case where the first threshold value corresponds to a state of greater than 127, every edge represented by the binary second-intermediate-mask signal is shifted inward relative to a corresponding edge represented by the binary original-mask signal. In this case, the second intermediate mask has a contracted white area or areas. When the first threshold value corresponds to a state of 127, every edge represented by the binary second-intermediate-mask signal is the same in position as a corresponding edge represented by the binary original-mask signal.

In FIG. 17, two edges represented by the binary second-intermediate-mask signal are shifted outward relative to corresponding edges represented by the binary original-mask signal. The position of every edge represented by the binary second-intermediate-mask signal can be arbitrarily adjusted by changing the characteristics of the first low pass filter 81 and the first threshold value used by the binarizer 82. The characteristics of the first low pass filter 81 depend on not only the number of taps therein but also filter coefficients set therein.

Figure 18:
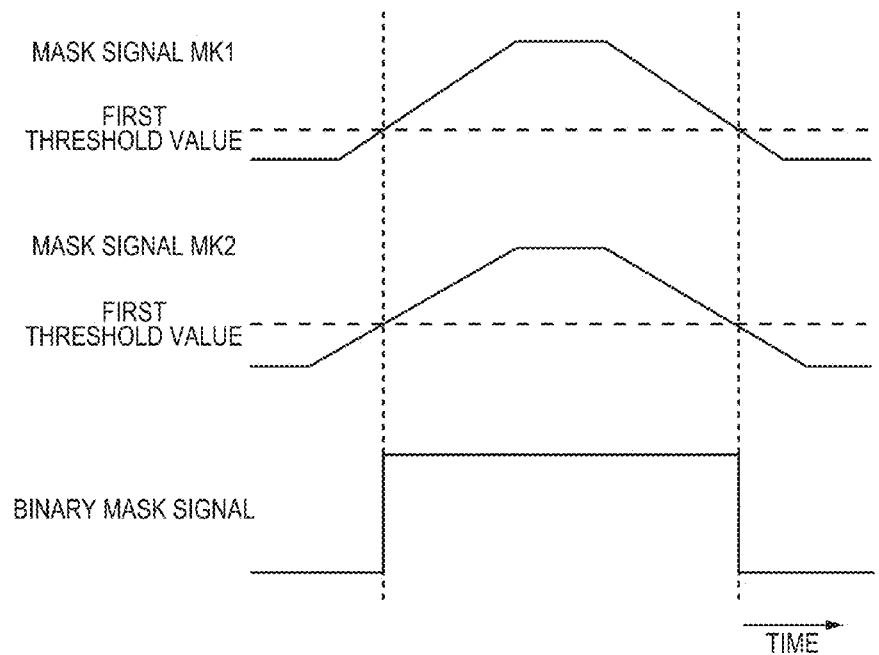
FIG. 18 is a time-domain diagram of filtered mask signals and a binary mask signal occurring in the mask correcting section in FIG. 16.

With reference to FIG. 18, a filtered mask signal MK1 from the first low pass filter 81 represents slopes steeper and shorter than those represented by a filtered mask signal MK2 therefrom. A binary mask signal resulting from binarizing the filtered mask signal MK1 through the use of a lower first threshold value and a binary mask signal resulting from binarizing the filtered mask signal MK2 through the use of a higher first threshold value are equal in edge position. The user can input information signals representative of desired characteristics of the first low pass filter 81 and a desired first threshold value by actuating the operation unit 60. The information signals are sent from the operation unit 60 to the mask correction section 80 via the operation accepting section 40. The actual characteristics of the first low pass filter 81 are set to the desired characteristics. The actual first threshold value used by the binarizer 82 is set to the desired first threshold value. The position of every edge represented by the binary second-intermediate-mask signal can be arbitrarily adjusted by changing the characteristics of the first low pass filter 81 or the first threshold value used by the binarizer 82 or changing not only the characteristics of the first low pass filter 81 but also the first threshold value used by the binarizer 82 in accordance with user's request. A low first threshold value is applicable to the case where the first low pass filter 81 is designed to generate a first-intermediate-mask signal representing relatively short slopes. Accordingly, the low first threshold value allows the tap number in the first low pass filter 81 to be reduced and hence enables the first low pass filter 81 to be simplified.

With reference back to FIG. 17, the binary second-intermediate-mask signal from the binarizer 82 is inputted into the second low pass filter 83. At a step S83, the device 83 subjects the binary second-intermediate-mask signal to low pass filtering to generate the mask signal of the third intermediate mask in which every edge is sloped and blurred.

The third-intermediate-mask signal from the second low pass filter 83 is inputted into the clipper 84. At a step S84, the device 84 clips the third-intermediate-mask signal through the use of the second threshold value to generate the mask signal of the corrected mask. Specifically, the clipper 84 compares pixel values represented by the third-intermediate-mask signal with the second threshold value, and clips pixel values less than the second threshold value to 0 while leaving pixel values equal to or greater than the second threshold value as they are. Thus, for every edge area, the clipper 84 leaves the slope portion in a white side as it is while deleting the slope portion in a black side by replacing the slope portion with a black area. Accordingly, a portion of every edge area which has pixel values greater than the second threshold value is sloped such that a pixel value varies from a white value to a gray value. On the other hand, a portion of every edge area which has pixel values less than the second threshold value is set to a black area. The operation of the clipper 84 spatially limits every sloped area in the corrected mask and prevents every edge in the corrected mask from being greater than an intended size.

In FIG. 17, blurring edges is along the horizontal direction. The first and second low pass filters 81 and 83 may be two-dimensional low pass filters. In this case, not only blurring edges along the horizontal direction but also blurring edges along the vertical direction are implemented. Each of the two-dimensional low pass filters may be designed so that filter coefficients for the horizontal direction will differ from those for the vertical direction. This design enables the position, sloping degree, and width of every sloped edge in the corrected mask can be adjusted individually for each of the horizontal direction and the vertical direction.

The first and second low pass filters 81 and 83 may be elliptic two-dimensional low pass filters each designed so that filter coefficients for the horizontal direction will differ from those for the vertical direction and that filter coefficients for an oblique direction will be between those for the horizontal direction and those for the vertical direction. In this case, the position, sloping degree, and width of every sloped edge in the corrected mask can be adjusted individually for each of the horizontal direction and the vertical direction, and the adjustment can be effected along the oblique direction. For example, a square in the original mask can be processed into a rectangle in the corrected mask which has horizontal sides, vertical sides different in length from the horizontal sides, and rounded corners. Furthermore, a square in the original mask can be processed into a rectangle in the corrected mask which has sloped horizontal-side edges with a first sloping degree, sloped vertical-side edges with a second sloping degree different from the first sloping degree, and sloped corner edges with a sloping degree which gradually varies and continuously connects to the sloping degrees of the horizontal-side edges and the vertical-side edges.

Figure 19:
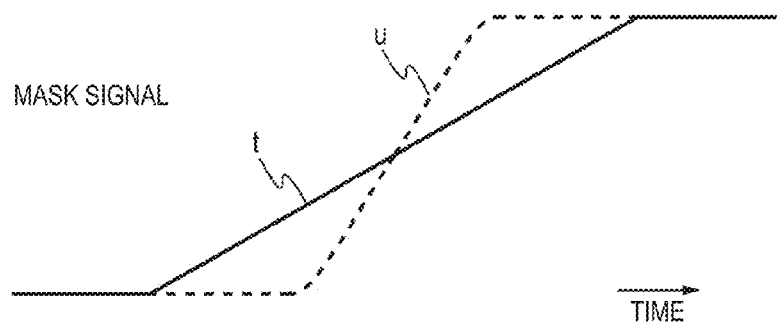
FIG. 19 is a time-domain diagram of slopes represented by filtered mask signals occurring in the mask correcting section in FIG. 16.

With reference to FIG. 19, a slope "t" represented by a mask signal is provided by the first low pass filter 81. The slope "t" is provisional one used for adjusting binarization boundary positions. The slope "t" disappears after the binarization by the device 82. Thus, the slope "t" may be of a linear type with a constant inclination angle or gradient. On the other hand, a slope "u" represented by a mask signal is provided by the second low pass filter 83. At least part of the slope "u" remains in the corrected mask. Preferably, the shape of the slope "u" is adjusted in accordance with user's request. For example, the shape of the slope "u" is adjusted so that an upper portion of the slope "u" will be convex upward while a lower portion thereof will be convex downward. This adjusted shape allows a great clipped value width.

The position and width of every blurred edge area represented by the corrected-mask signal and the size of every effective area in the corrected mask can be freely and individually adjusted by changing the characteristics (the tap number and the filter coefficients) of the first and second low pass filters 81 and 83, the first threshold value used by the binarizer 82, and the second threshold value used by the clipper 84. All the mask signals of the different layers are subjected to the same process of blurring edges. Alternatively, the mask signals of the different layers may be subjected to different edge blurring processes respectively.

The previously-mentioned edge blurring process can shift edges represented by the mask signals to arbitrary positions, and can change the sizes of effective areas in the masks. Furthermore, the edge blurring process can arbitrarily slope edge areas represented by the mask signals, and can spatially limit the blurred edge areas in the masks on an arbitrary basis.

The corrected masks of the different layers are used by a later stage for combining the layer depth maps into a synthesized depth map (a final depth map). Specifically, the depth map processing section 20 alpha-blends the layer depth maps at a blending ratio decided by pixel values in the corrected masks, and thereby generates the synthesized depth map.

As previously mentioned, the corrected masks are used in combining the layer depth maps into the synthesized depth map. The use of the corrected masks provides continuity to portions of the synthesized depth map which correspond to object boundaries. Specifically, a great step-like value difference at an object boundary is smoothed to attain continuity. Therefore, in a different-viewpoint image generated on the basis of the synthesized depth map, every object boundary looks natural.

Some object has a vague boundary or contour. Such an object corresponds to a mask reflecting an inaccurate contour. By adjusting the position of the contour, it is possible to prevent a corresponding object contour in the different-view point image from being unnatural.

Each original mask is processed into a corrected mask by the mask correcting section 80 as follows. The size of each effective area in the original mask is varied. Every edge portion in the original mask is sloped through the use of a low pass filter. Specifically, pixel values in the edge portion are set to values intermediate between 0 and 1 which form a slope. The corrected mask contains these intermediate values. The layer depth maps are alpha-blended into a synthesized depth map in accordance with the intermediate values in the corrected masks.

The mask correcting section 80 processes the original masks into the corrected masks to provide continuity to portions in the synthesized depth map which correspond to object boundaries. Thereby, in a different-viewpoint image generated on the basis of the synthesized depth map, unnaturalness at every object boundary can be inconspicuous. Processing each original mask into a corrected mask is implemented by, for example, a digital filter carrying out product-sum operations or computations. In this case, the digital filter is in the mask correcting section 80.

Third Embodiment

A third embodiment of this invention is similar to the second embodiment thereof except for points mentioned hereafter. The third embodiment is designed in light of the following circumstances.

Blurring edges in a mask is to make inconspicuous a defect at every object boundary in a resultant 3D image perceived by the viewer. Such a defect is a distortion which occurs in a texture image portion of a background near an object when missing pixels resulting from pixel shift are interpolated on the basis of nearby pixels. Thus, the occurrence of a defect depends on whether a texture is present in or absent from a background near an object. Generally, in the case of a featureless flat image, a defect does not occur at object boundaries, and hence blurring edges in original masks is unnecessary.

In the third embodiment of this invention, there is provided a means for locally changing the degree of correcting original masks. Furthermore, a texture amount in a background near every object is used as a part of an index about the optimization of an edge blurring process on the original masks. Specifically, an input 2D image is analyzed and thereby texture amounts in respective portions of the input 2D image are calculated. The strength of the edge blurring process on the original masks is adaptively controlled in response to the calculated texture amounts on a pixel-by-pixel basis. This adaptive control is to optimize the edge blurring process on the original masks. For example, a mask portion corresponding to an input 2D image portion rich in background texture is subjected to a strong edge blurring process, whereas a mask portion corresponding to an input 2D image portion having a small or zero background texture amount is subjected to an edge blurring process with a strength suppressed depending on the texture amount. Thus, the mask portion corresponding to the input 2D image portion having the small or zero background texture amount is prevented from undergoing an excessively strong edge blurring process.

Figure 20:
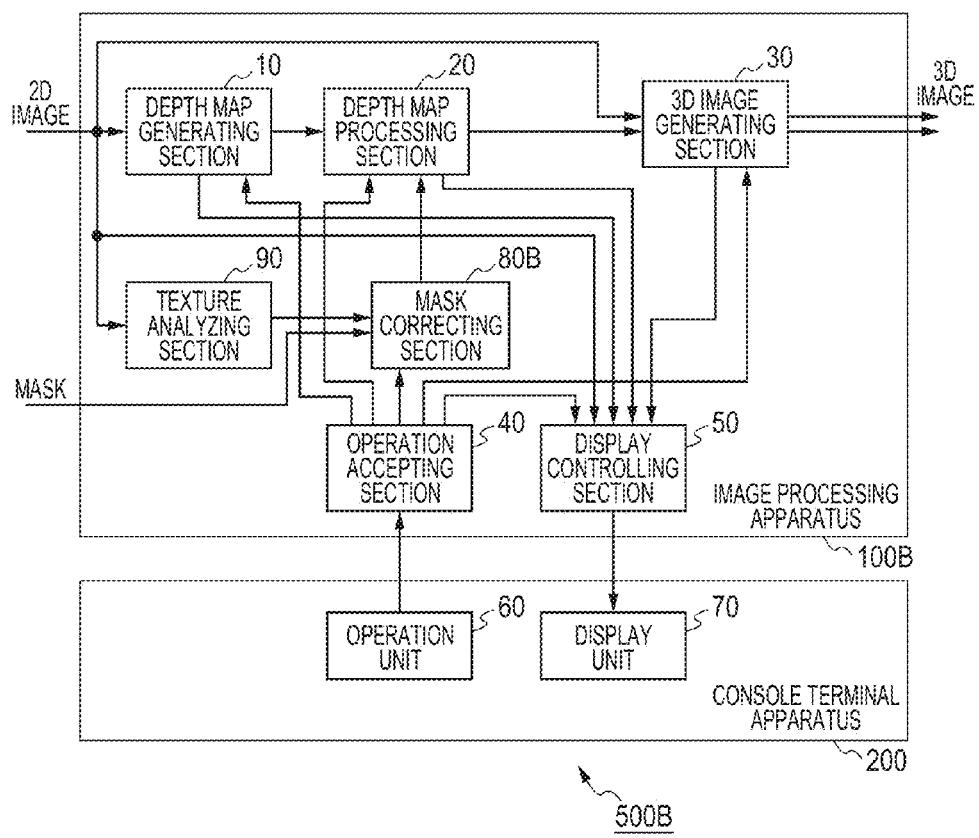
FIG. 20 is a diagram of an image editing system according to a third embodiment of this invention.

FIG. 20 shows an image editing system 500B in the third embodiment of this invention. The image editing system 500B differs from the image editing system 500A of FIG. 13 in that an image processing apparatus 100B in the system 500B additionally has a texture analyzing section 90. The image editing system 500B is similar to the image editing system 500A except for the following points.

The image processing apparatus 100B substitutes for the image processing apparatus 100A in FIG. 13. The image processing apparatus 100B includes a mask correcting section 80B instead of the mask correcting section 80 in FIG. 13. The texture analyzing section 90 in the image processing apparatus 100B receives an input image signal representing an input 2D image or an original-viewpoint 2D image. The section 90 analyzes the input 2D image on, for example, a line-by-line scanning basis to detect conditions of background textures therein. The section 90 notifies the detected background texture conditions to the mask correcting section 80B.

Preferably, the image processing apparatus 100B includes a computer that operates in accordance with a control program (a computer program) stored in an internal memory or an external memory or storage. The computer and the control program are designed to implement the sections of the image processing apparatus 100B.

Figure 21:
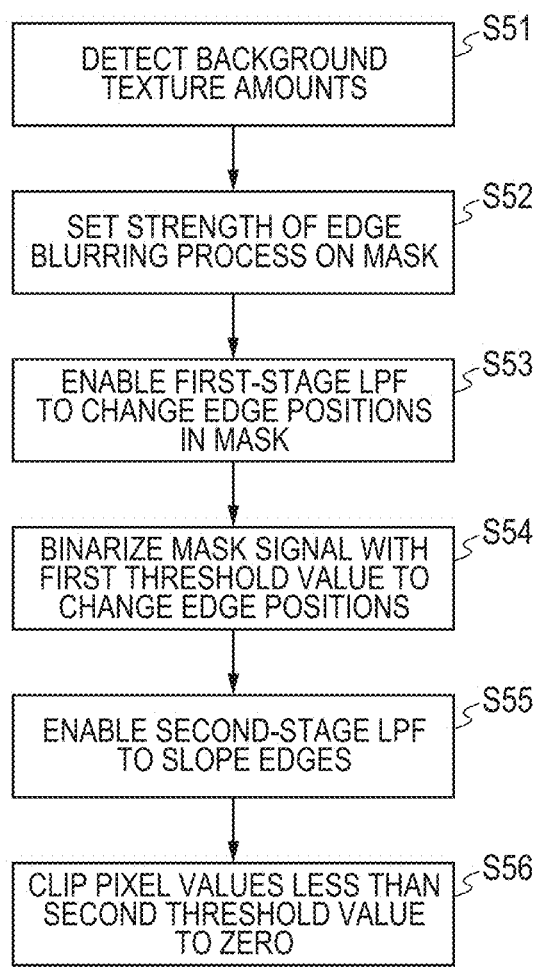
FIG. 21 is a flowchart of a segment of a control program for a computer in an image processing apparatus in FIG. 20.

FIG. 21 is a flowchart of a segment of the control program which is executed each time the input 2D image is updated. At a step S51, the texture analyzing section 90 detects background textures in the input 2D image. Specifically, the texture analyzing section 90 differentiates luminance values at pixels, and take absolute values of the differentiation results. Thereby, the texture analyzing section 90 calculates the amount of a variation in luminance value between every two neighboring pixels. A place with great calculated variation amounts is regarded as a 2D image portion where the luminance greatly varies, that is, a 2D image portion with a high-contrast texture.

A horizontal-direction position and a vertical-direction position in the input 2D image are denoted by "x" and "y", respectively. The luminance value at a point (x, y) in the input 2D image is expressed by f(x, y). Calculating a difference in luminance value between a pixel of interest and the next pixel as viewed in the horizontal direction is referred to as differentiating luminance values at a pixel of interest and the next pixel. In this case, a differentiation result or a derivative D(x, y) at a pixel position (x, y) is given by the following equation.

$$D(x,y)=f(x+1,y)-f(x,y)$$

The texture analyzing section 90 calculates the derivative D(x, y) from the luminance value f(x, y) at the position (x, y) of the pixel of interest and the luminance value f(x+1, y) at the position (x+1, y) of the next pixel according to the above equation. The texture analyzing section 90 iterates the calculation of the derivative D(x, y) while scanning the input 2D image and repetitively updates the pixel of interest from one to the next.

The absolute value of the derivative D(x, y) increases as the difference between the luminance value f(x, y) at the position (x, y) of the pixel of interest and the luminance value f(x+1, y) at the position (x+1, y) of the next pixel is greater. Thus, the above differentiation corresponds to deriving a variation in pixel value in the input 2D image, that is, deriving a texture amount in the input 2D image. The differentiation in the horizontal direction may be replaced by the differentiation in the vertical direction or the combination of the horizontal-direction differentiation and the vertical-direction differentiation. The above differentiation equation may be replaced by another equation for calculating the amount of a variation or the difference in luminance value between two neighboring pixels.

The texture analyzing section 90 calculates the absolute value of the derivative D(x, y) and labels the calculated absolute value as a background texture amount F(x, y) at the point (x, y) in the input 2D image. Thus, the background texture amount F(x, y) is expressed as follows.

$$F(x,y)=|D(x,y)|$$

The texture analyzing section 90 notifies the background texture amount F(x, y) to the mask correcting section 80B.

As understood from the above description, luminance is used in calculating a background texture amount in the input 2D image. Luminance may be replaced by another image-related parameter such as hue, brightness, or chroma. A combination of at least two among luminance, hue, brightness, and chroma may be used in calculating a background texture amount in the input 2D image.

At a step S52 following the step S51, the mask correcting section 80B sets the strength of an edge blurring process on original masks in accordance with the background texture amount F(x, y) notified by the texture analyzing section 90. Specifically, the mask correcting section 80B controls the strength of an edge blurring process in response to the background texture amount F(x, y). The mask correcting section 80B carries out the strength control by varying the number of taps in at least one of first and second low pass filters 81 and 83 (see FIG. 16) therein.

Figure 22:
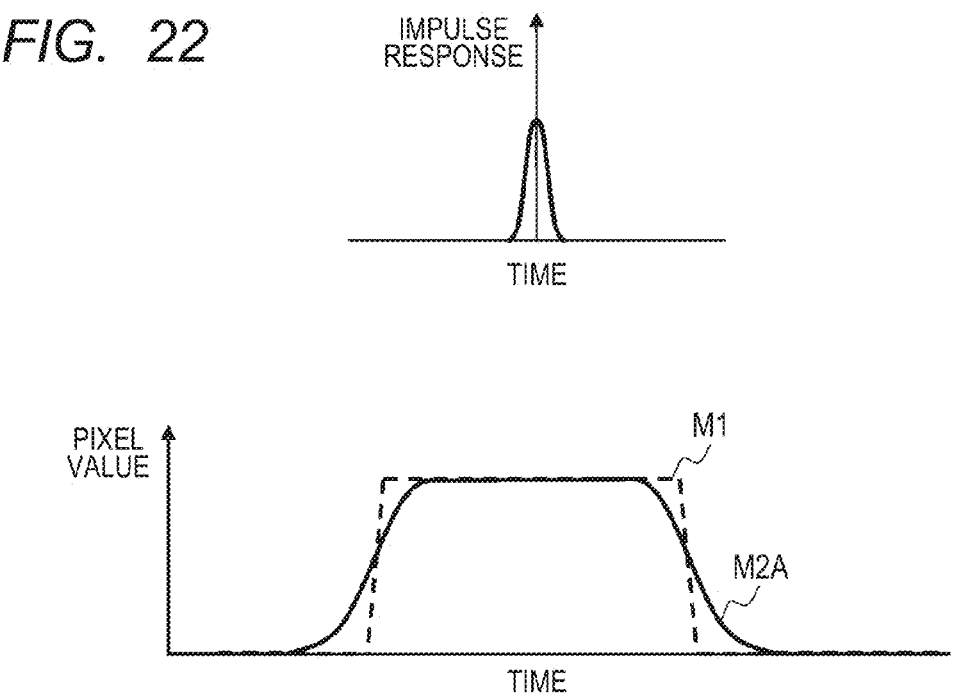
FIG. 22 is a time-domain diagram showing an impulse response of a low pass filter having a small number of taps, an original-mask signal, and a corrected-mask signal resulting from filtering the original-mask signal through the foregoing low pass filter.

FIG. 22 shows, in its upper part, the impulse response of a low pass filter having a small number of taps. In the lower part of FIG. 22, M1 denotes a pixel-value variation represented by a 1-line portion of an original-mask signal, and M2A denotes that represented by a 1-line portion of a corrected-mask signal resulting from filtering the original-mask signal through the low pass filter having the small number of taps.

Figure 23:
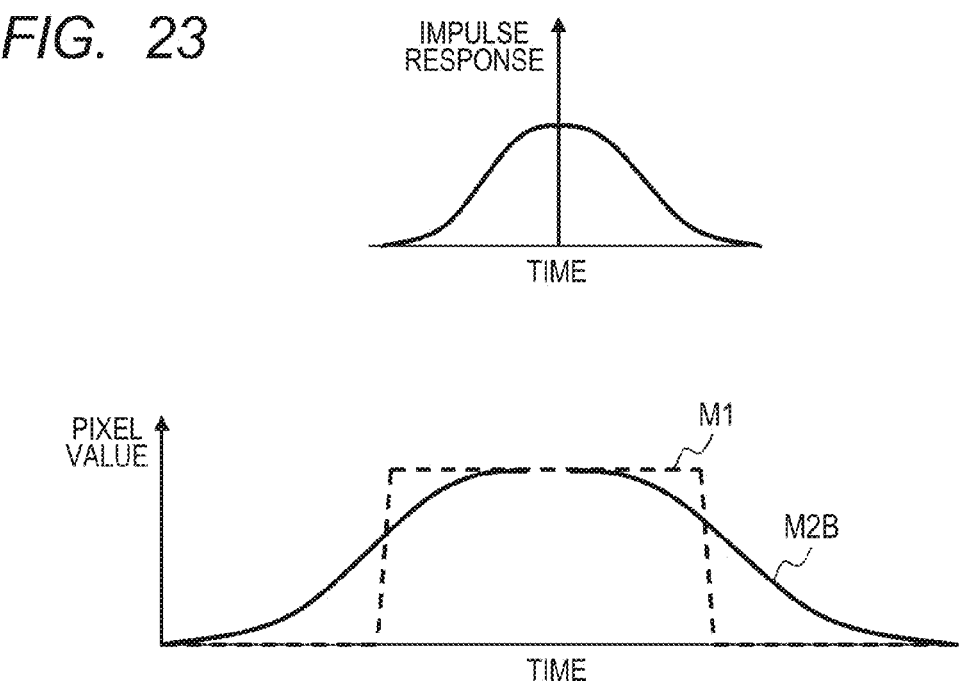
FIG. 23 is a time-domain diagram showing an impulse response of a low pass filter having a large number of taps, an original-mask signal, and a corrected-mask signal resulting from filtering the original-mask signal through the foregoing low pass filter.

FIG. 23 shows, in its upper part, the impulse response of a low pass filter having a large number of taps. In the lower part of FIG. 23, M1 denotes a pixel-value variation represented by a 1-line portion of an original-mask signal, and M2B denotes that represented by a 1-line portion of a corrected-mask signal resulting from filtering the original-mask signal through the low pass filter having the large number of taps.

It is understood from the comparison between the pixel-value variations M2A and M2B in FIGS. 22 and 23 that the slope at every edge in a filtered mask is gentler and the area of the slope is wider as the number of taps in a low pass filter for processing an original mask into the filtered mask is larger. Thus, as the number of taps in the low pass filter 81 (see FIG. 16) is larger, the effect of blurring every edge reaches places remoter than the edge. As the number of taps in the low pass filter 83 (see FIG. 16) is larger, the slope at every edge in a filtered mask is gentler and the range where background depths and foreground depths are alpha-blended is wider so that the strength of blurring every edge increases.

In the case where every pixel in the input 2D image is expressed by a set of 8 bits, the background texture amount F(x, y) in the input 2D image will not exceed a value of 255 and is normalized in the range of 0 to 255.

At the step S52, the mask correcting section 80B calculates a first desired number "T" of taps in each of the low pass filters 81 and 83 from the normalized background texture amount F(x, y) according to the following equation.

$$T = T\max \cdot F(x,y)/255$$

where Tmax denotes the maximum number of taps. Thus, the first desired tap number "T" is equal to the maximum tap number Tmax multiplied by the coefficient given on the basis of the normalized background texture amount F(x, y). Then, the mask correction section 80B rounds off the first desired number to an integer labeled as a second desired number. The round-off may be replaced by round-up or round-down. The mask correcting section 80B sets the actual number of taps in each of the low pass filters 81 and 83 to the second desired number, and thereby controls the strength of the edge blurring process in accordance with the background texture amount F(x, y).

As previously mentioned, the background texture amount F(x, y) in the input 2D image is in the range of 0 to 255. The background texture amount F(x, y) may be in another range.

A sequence of steps S53-S56 follows the step S52. The steps S53-S56 are similar to the steps S81-S84 in FIG. 17, respectively.

As understood from the above description, the degree of correcting the original masks is locally controlled in accordance with the result of the analyzation of background texture conditions. Thus, it is possible to prevent the correction from being made on portions of the original masks which should be maintained as they are. The prevention of the correction reduces computational complexity. Furthermore, the foregoing portions of the original masks do not cause an unnatural change in a different-viewpoint image which would be caused if they were corrected.

As previously mentioned, the background texture amount F(x, y) is normalized in the range corresponding to the number of bits representing one pixel. The first desired number "T" of taps in each of the low pass filters 81 and 83 is calculated from the normalized background texture amount F(x, y) through a linear operation or computation. It should be noted that the linear operation or computation may be replaced by a nonlinear operation or computation.

Fourth Embodiment

A fourth embodiment of this invention is similar to the third embodiment thereof except for a design change mentioned hereafter.

In the fourth embodiment of this invention, a threshold value is provided for a background texture amount F(x, y) in an input 2D image. Filtering is prevented from being made on portions of original-mask signals which correspond to portions of the input 2D image where the background texture amount F(x, y) is less than the threshold value. Alternatively, the number of taps in each of low pass filters 81 and 83 may be set to a minimum value for these portions of the original-mask signals. The fourth embodiment is designed in light of the following circumstances.

There is a chance that a very small background texture amount F(x, y) may be caused by noise. Such a background texture amount F(x, y) will reduce the reliability and accuracy of an edge blurring process on original masks. There is a fair chance that a remarkably small background texture amount F(x, y) may be caused by noise superimposed on texture-less flat portions of an input 2D image. Portions of the original masks which correspond to such texture-less flat portions of the input 2D image should be maintained without being corrected.

Figure 24:
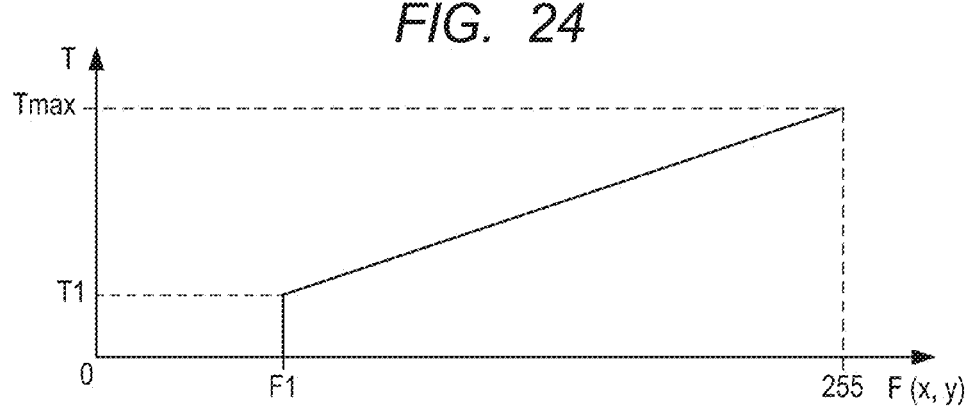
FIG. 24 is a diagram of a relation between the number of taps in each low pass filter and a background texture amount in a fourth embodiment of this invention.

With reference to FIG. 24, a first desired number "T" of taps in each of the low pass filters 81 and 83 is set to 0 when the background texture amount F(x, y) is less than a threshold value F1. The first desired tap number "T" set to 0 means that original-mask signals are prevented from being filtered. The first desired tap number "T" is set to a prescribed number T1 when the background texture amount F(x, y) is equal to the threshold value F1. The prescribed number T1 is smaller than a maximum number Tmax. The first desired tap number "T" linearly increases from the prescribed number T1 to the maximum number Tmax as the background texture amount F(x, y) increases from the threshold value F1 to a value of 255.

Generally, portions of the input 2D image where the background texture amount F(x, y) is very small correspond to portions of the original masks which should be maintained without being corrected. In the fourth embodiment of this invention, the edge blurring process is prevented from being made on such portions of the original masks, and hence the reliability and effect of the edge blurring process can be enhanced.

Fifth Embodiment

A fifth embodiment of this invention is similar to the fourth embodiment thereof except for a design change mentioned hereafter.

Figure 25:
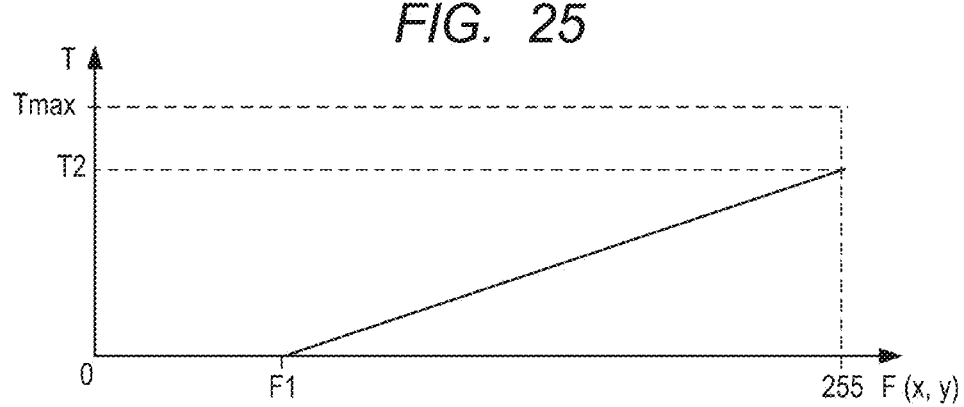
FIG. 25 is a diagram of a relation between the number of taps in each low pass filter and a background texture amount in a fifth embodiment of this invention.

With reference to FIG. 25, a first desired number "T" of taps in each of the low pass filters 81 and 83 is set to 0 when a background texture amount F(x, y) is equal to or less than a threshold value F1. The first desired tap number "T" linearly increases from 0 to a prescribed number T2 as the background texture amount F(x, y) increases from the threshold value F1 to a value of 255. The prescribed number T2 is smaller than a maximum number Tmax.

In the fifth embodiment of this invention, the first desired tap number "T" is prevented from discontinuously varying when the background texture amount F(x, y) changes across the threshold value F1. Thus, an image variation between an image portion corresponding to a filtered mask signal portion and an image portion corresponding to a non-filtered mask signal portion can be gentler and smoother.

Sixth Embodiment

A sixth embodiment of this invention is similar to one of the third to fifth embodiments thereof except for design changes mentioned hereafter.

In the sixth embodiment of this invention, a normalized background texture amount F(x, y) is normalized again. In the case where every pixel is expressed by a set of 8 bits, the background texture amount F(x, y) is normalized in the range of 0 to 255. The normalized background texture amount F(x, y) is normalized into a second normalized background texture amount G(x, y) according to an arbitrary dynamic range.

For example, the normalization of the normalized background texture amount F(x, y) into the second normalized background texture amount G(x, y) is carried out by referring to the following equations.

$$G(x,y)=0 \text{ when } F(x,y)<F2$$

$$G(x,y)=255\cdot(F(x,y)-F2)/(F3-F2) \text{ when } F2\leq F(x,y) <F3$$

$$G(x,y)=255 \text{ when } F3\leq F(x,y)$$

where F2 and F3 denote a minimum threshold value and a maximum threshold value for the normalized background texture amount F(x, y), respectively. The threshold values F2 and F3 may be arbitrary values in the range of 0 to 255 provided that the threshold value F2 is smaller than the threshold value F3.

Figure 26:
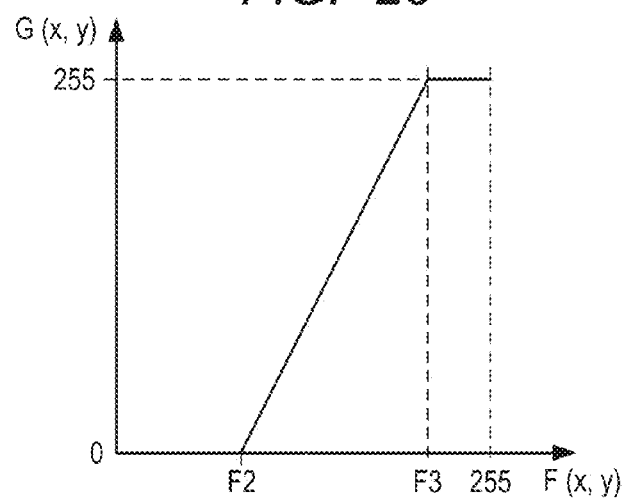
FIG. 26 is a diagram of a relation between a normalized background texture amount and a second normalized background texture amount in a sixth embodiment of this invention.

With reference to FIG. 26, the second normalized background texture amount G(x, y) is equal to a value of 0 when the normalized background texture amount F(x, y) is equal to or less than the threshold value F2. The second normalized background texture amount G(x, y) linearly increases from a value of 0 to a value of 255 as the normalized background texture amount F(x, y) increases from the threshold value F2 to the threshold value F3. The second normalized background texture amount G(x, y) is equal to a value of 255 when the normalized background texture amount F(x, y) is equal to or greater than the threshold value F3.

In the sixth embodiment of this invention, a first desired number "T" of taps in each of low pass filters 81 and 83 (see FIG. 16) is controlled depending on the second normalized background texture amount G(x, y) rather than the normalized background texture amount F(x, y).

As previously mentioned, the normalized background texture amount F(x, y) is normalized into the second normalized background texture amount G(x, y). The number of taps in each of the low pass filters 81 and 83 is decided on the basis of the second normalized background texture amount G(x, y). Thereby, the gain of the control of the filter tap number can be effectively distributed with respect to an arbitrary range of the normalized background texture amount F(x, y) in the input 2D image. Preferably, the minimum threshold value F2 is chosen so as to prevent the second normalized background texture amount G(x, y) from being adversely affected by noise. In this case, it is possible to prevent an edge blurring process from being made on portions of the original masks which correspond to portions of the input 2D image where the normalized background texture amount F(x, y) is very small, and which should be maintained without being corrected. Accordingly, the reliability and effect of the edge blurring process can be enhanced.

The normalized background texture amount F(x, y) may be normalized in a way different from the above-mentioned way. The normalization of the normalized background texture amount F(x, y) is designed so that the second normalized background texture amount G(x, y) will be in the range of 0 to 255. One of the threshold values F2 and F3 may be omitted.

Seventh Embodiment

A seventh embodiment of this invention is similar to the third embodiment thereof except for a design change mentioned hereafter.

In the seventh embodiment of this invention, a conversion table formed by a lookup table is used in setting the number of taps in each of low pass filters 81 and 83 (see FIG. 16) in accordance with a background texture amount F(x, y) in an input 2D image. The conversion table defines a prescribed relation between a first desired number "T" of taps in each of the low pass filters 81 and 83 and a normalized background texture amount F(x, y). The prescribed relation can be arbitrarily preset. Thus, the prescribed relation can be nonlinear and complicated. When accessed in response to the normalized background texture amount F(x, y), the conversion table outputs the corresponding first desired tap number according to the prescribed relation. Preferably, the prescribed relation is designed so that an edge blurring process on original masks can be kept proper for all portions of the original masks.

Figure 27:
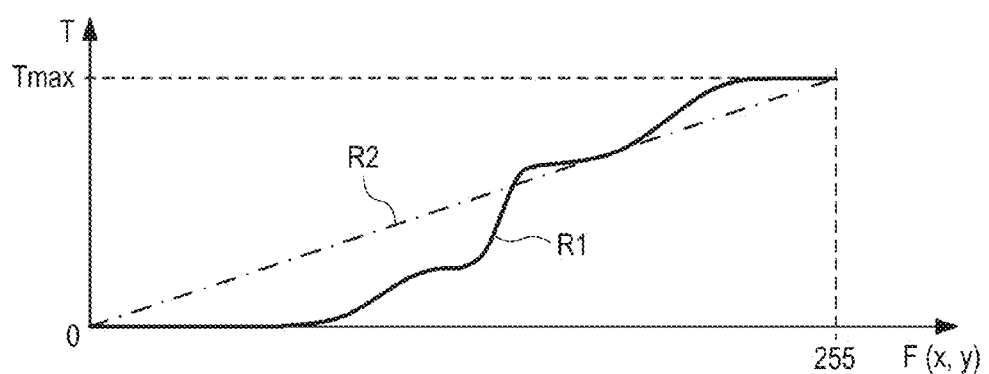
FIG. 27 is a diagram of a relation between the number of taps in each low pass filter and a background texture amount in a seventh embodiment of this invention.

With reference to FIG. 27, the character R1 denotes an example of the prescribed relation between the first desired tap number "T" and the normalized background texture amount F(x, y) which is defined by the conversion table. The prescribed relation R1 is nonlinear and complicated. The character R2 denotes a proportional relation between the first desired tap number "T" and the normalized background texture amount F(x, y) which is obtained through a linear operation without using the conversion table. The complicated prescribed relation R1 is provided by the conversion table without carrying out complicated computations.

In FIG. 27, the background texture amount F(x, y) is in the range of 0 to 255. The conversion table may be modified to be applicable to the case where the background texture amount F(x, y) is in another range.

Eighth Embodiment

An eighth embodiment of this invention is similar to one of the third to seventh embodiments thereof except for a design change mentioned hereafter.

In the eighth embodiment of this invention, a signal representative of a normalized background texture amount F(x, y) is past through a low pass filter to disperse the normalized background texture amount F(x, y). The dispersion of the normalized background texture amount F(x, y) makes spatially uniform the effect of an edge blurring process on original masks. As a result, corrected masks have uniformly blurred edges. Therefore, a resultant 3D image perceived by the viewer can be natural.

Specifically, a derivative D(x, y) in luminance at a point (x, y) in an input 2D image is converted into a filtered derivative $\Sigma(x, y)$ through low pass filtering expressed by, for example, the following equation.

$$E(x,y)=\{(D(x,y)+0.5D(x-1,y)+0.5D(x+1,y)\}/2$$

The absolute value of the filtered derivative E(x, y) is calculated, and the calculated absolute value is labeled as a background texture amount F(x, y).

The above low pass filter may be replaced by a low pass filter having a different number of taps. The above low pass filter is of a horizontal-direction type. Alternatively, the above low pass filter may be of a vertical-direction type. The above low pass filter may be replaced by a two-dimensional low pass filter that implements low pass filtering in both the horizontal direction and the vertical direction.

The use of the low pass filter prevents edges in the original masks from being unnaturally blurred. For example, the use of the low pass filter enables the edge blurring process to be effected uniformly throughout areas in the original masks which correspond to a background texture of a striped pattern in the input 2D image. Without the low pass filtering process, the effect of the edge blurring process tends to be strong for portions of the original masks which correspond to lines in the striped background texture, and to be weak for portions of the original masks which correspond to the centers between lines in the striped background texture. Such a difference in effect may cause a resultant 3D image perceived by the viewer to be unnatural. The use of the low pass filter prevents the occurrence of such a difference in effect.

What is claimed is:

1. An image processing apparatus comprising:
a mask correcting section including filters each having a settable number of taps and configured to filter externally-set mask patterns and thereby correct the externally-set mask patterns into corrected mask patterns at a variable filtering correction degree depending on the number of taps in each of the filters, wherein the number of taps in each of the filters is equal to or less than a given maximum;
a depth map processing section configured to process a depth map for each of areas designated by the corrected mask patterns respectively, the depth map being for an input image;
an image generating section configured to generate a different-viewpoint image on the basis of the input image and the depth map processed by the depth map processing section, the different-viewpoint image relating to a viewpoint different from the viewpoint concerning the input image; and
a texture analyzing section configured to differentiate at least one of luminance, hue, brightness, and chroma in the input image to obtain a differentiation result, and calculate an absolute value of the obtained differentiation result;
wherein the mask correcting section multiplies the calculated absolute value and the given maximum to obtain a multiplication result and sets the number of taps in each of the filters in response to the obtained multiplication result to determine the filtering correction degree in response to the obtained multiplication result.

2. An image processing apparatus as recited in claim 1, wherein the mask correcting section compares the calculated absolute value with a prescribed threshold value, and fixes the number of taps in each of the filters to a prescribed number when the calculated absolute value is less than the prescribed threshold value.

3. An image processing apparatus as recited in claim 1, wherein the mask correcting section normalizes the calculated absolute value into a normalized value and replaces the calculated absolute value with the normalized value when the calculated absolute value is in a given range, and replaces the calculated absolute value with a prescribed minimum value when the calculated absolute value is smaller than the given range and replaces the calculated absolute value with a prescribed maximum value when the calculated absolute value is greater than the given range.

4. An image processing apparatus as recited in claim 1, wherein the mask correcting section filters the differentiation result into a filtered value and replaces the differentiation result by the filtered value.

5. A method of processing an image, comprising the steps of:
filtering externally-set mask patters through filters each having a settable number of taps and thereby correcting the externally-set mask patterns into corrected mask patterns at a variable filtering correction degree depending on the number of taps in each of the filters, wherein the number of taps in each of the filters is equal to or less than a given maximum;
processing a depth map for each of areas designated by the corrected mask patterns respectively, the depth map being for an input image;
generating a different-viewpoint image on the basis of the input image and the processed depth map, the different-viewpoint image relating to a viewpoint different from the viewpoint concerning the input image; and
differentiating at least one of luminance, hue, brightness, and chroma in the input image to obtain a differentiation result, and calculating an absolute value of the obtained differentiation result;
wherein said filtering and correcting includes multiplying the calculated absolute value and the given maximum to obtain a multiplication result and setting the number of taps in each of filters in response to the obtained multiplication result to determine the filtering correction degree in response to the obtained multiplication result.

6. A non-transitory computer-readable medium storing an image processing program for enabling a computer to implement processes comprising the processes of:
filtering externally-set mask patters through filters each having a settable number of taps and thereby correcting the externally-set mask patterns into corrected mask patterns at a variable filtering correction degree depending on the number of taps in each of the filters, wherein the number of taps in each of the filters is equal to or less than a given maximum;
processing a depth map for each of areas designated by the corrected mask patterns respectively, the depth map being for an input image;
generating a different-viewpoint image on the basis of the input image and the processed depth map, the different-viewpoint image relating to a viewpoint different from the viewpoint concerning the input image; and
differentiating at least one of luminance, hue, brightness, and chroma in the input image to obtain a differentiation result, and calculating an absolute value of the obtained differentiation result;
wherein said filtering and correcting includes multiplying the calculated absolute value and the given maximum to obtain a multiplication result and setting the number of taps in each of the filters to determine the filtering correction degree in response to the obtained multiplication result.

7. An image processing apparatus comprising:
a mask correcting section including filters each having a settable number of taps and configured to filter externally-set mask patterns and thereby correct the externally-set mask patterns into corrected mask patterns at a variable filtering correction degree depending on the number of taps in each of the filters;

a depth map processing section configured to process a depth map for each of areas designated by the corrected mask patterns respectively, the depth map being for an input image;

an image generating section configured to generate a different-viewpoint image on the basis of the input image and the depth map processed by the depth map processing section, the different-viewpoint image relating to a viewpoint different from the viewpoint concerning the input image; and a texture analyzing section configured to differentiate at least one of luminance, hue, brightness, and chroma in the input image to obtain a differentiation result, and calculate an absolute value of the obtained differentiation result;

wherein the mask correcting section includes a prescribed conversion table for conversion of the calculated absolute value into a desired tap number, means for accessing the prescribed conversion table in response to the calculated absolute value to read out a corresponding desired tap number therefrom, and means for setting the number of taps in each of the filters to the read-out desired tap number to determine the filtering correction degree.

8. An image processing apparatus as recited in claim 7, wherein the mask correcting section compares the calculated absolute value with a prescribed threshold value, and fixes the number of taps in each of the filters to a prescribed number when the calculated absolute value is less than the prescribed threshold value.

9. An image processing apparatus as recited in claim 7, wherein the mask correcting section normalizes the calculated absolute value into a normalized value and replaces the calculated absolute value with the normalized value when the calculated absolute value is in a given range, and replaces the calculated absolute value with a prescribed minimum value when the calculated absolute value is smaller than the given range and replaces the calculated absolute value with a prescribed maximum value when the calculated absolute value is greater than the given range.

10. An image processing apparatus as recited in claim 7, wherein the mask correcting section filters the differentiation result into a filtered value and replaces the differentiation result by the filtered value.

* * * * *